United States Patent [19]

Speer et al.

[11] Patent Number: 4,855,543
[45] Date of Patent: Aug. 8, 1989

[54] MANUALLY OPERATED ELECTROMECHANICAL SWITCH

[75] Inventors: Gregg V. Speer, Bloomington; Donald L. Ray, Oaklandon, both of Ind.

[73] Assignee: Emhart Industries, Inc., Indianapolis, Ind.

[21] Appl. No.: 248,160

[22] Filed: Sep. 23, 1938

[51] Int. Cl.⁴ ...................... H01H 3/00; H01H 21/24
[52] U.S. Cl. ................. 200/61.27; 200/17 R; 200/537
[58] Field of Search .............. 200/6 R, 6 B, 6 BA, 200/6 BB, 6 C, 17 R, 18, 61.27–61.38, 553, 556, 557, 562

[56] References Cited

U.S. PATENT DOCUMENTS

| | | | |
|---|---|---|---|
| 2,845,499 | 7/1958 | Brown | 200/6 BB |
| 2,868,920 | 1/1959 | Mumford et al. | 200/61.27 X |
| 3,396,255 | 8/1968 | DeSmidt | 200/6 R X |
| 3,493,696 | 2/1970 | Rothweiler | 200/6 B X |
| 3,588,391 | 6/1971 | Banathy et al. | 200/6 BB |
| 4,182,939 | 1/1980 | Feaster | 200/6 B X |
| 4,376,236 | 3/1983 | Long et al. | 200/61.27 |
| 4,495,387 | 1/1985 | Thrush | 200/6 B |
| 4,739,131 | 4/1988 | Maeda | 200/61.27 |

*Primary Examiner*—J. R. Scott
*Attorney, Agent, or Firm*—Carl A. Forest

[57] ABSTRACT

An electromechanical switch includes a lever movable between neutral and activate positions, a first cam comprising a cylinder having oppositely disposed flat sides, a pair of elongated leaf springs, and a housing supporting the first cam sandwiched between the leaf springs, with the leaf springs bent a first non-zero amount when the lever is in neutral position and a second amount larger than the first amount when the lever is in the activate position, the leaf spring thereby acting to return the lever to neutral position whenever it is moved to activate position. There is also a detent which includes a second cam and a stop integrally formed with the second cam which is located between the lever and the first cam.

7 Claims, 11 Drawing Sheets

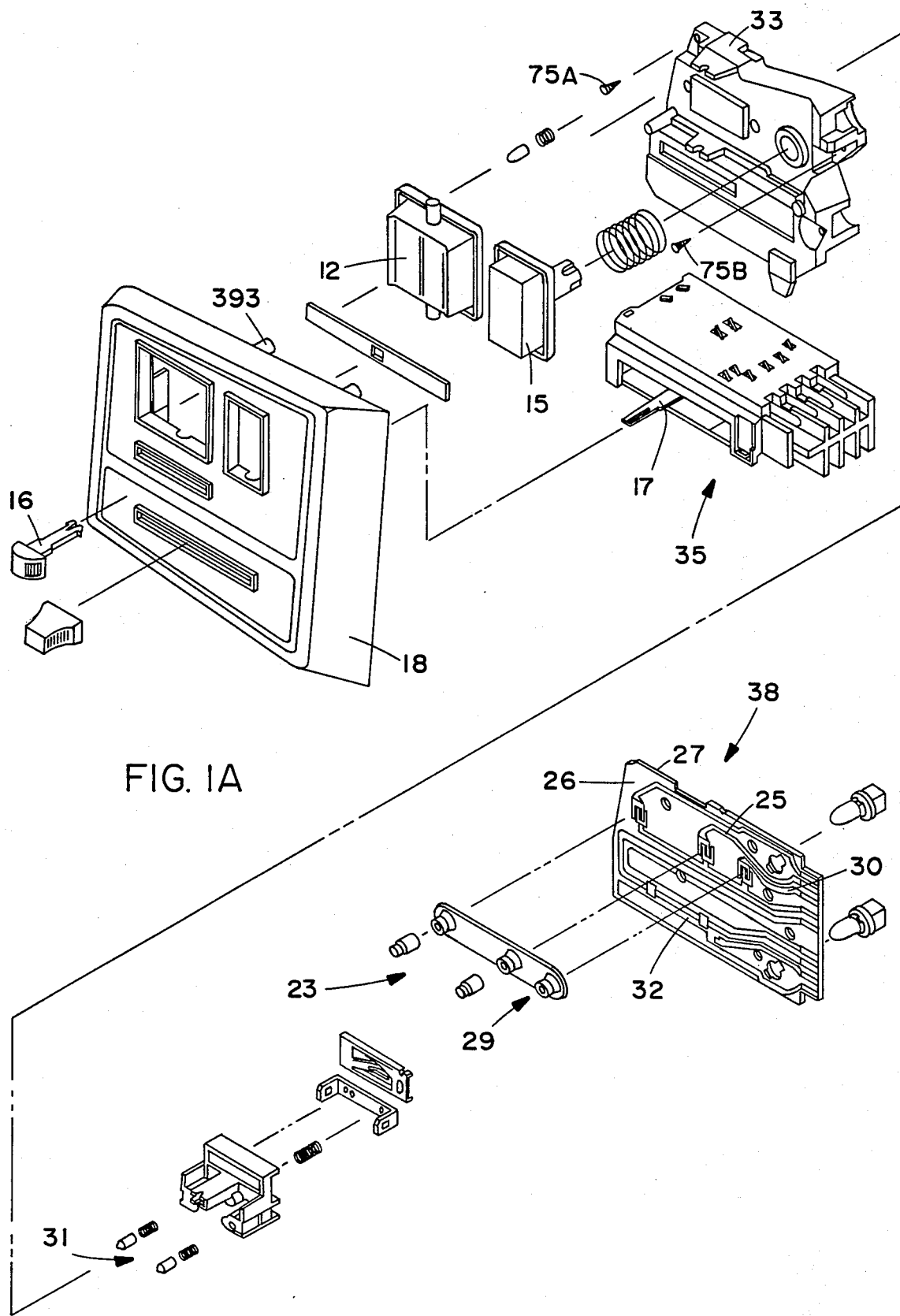
FIG. IA

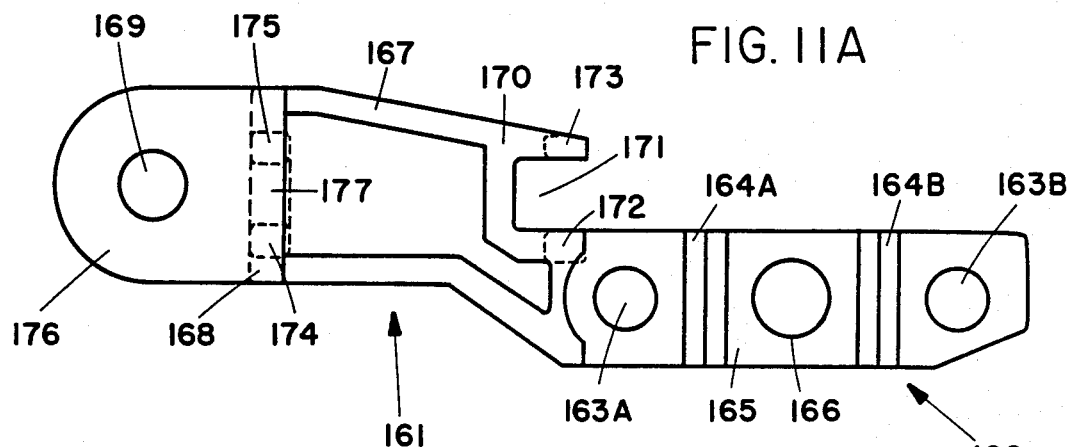
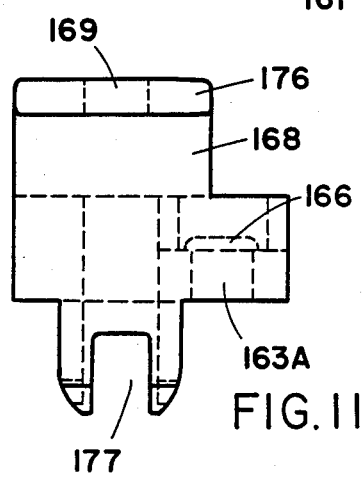
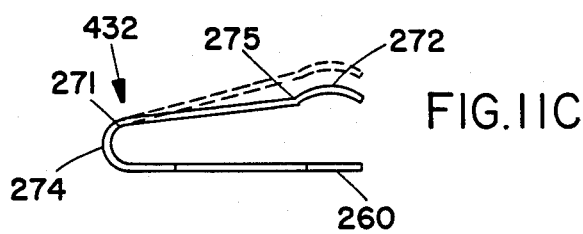
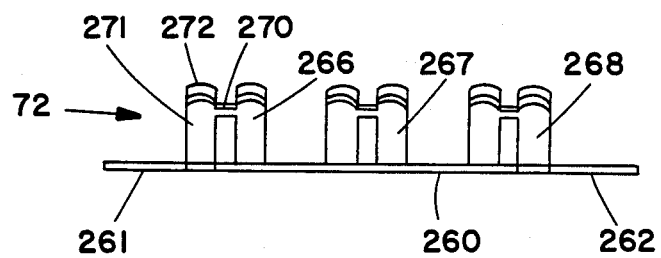
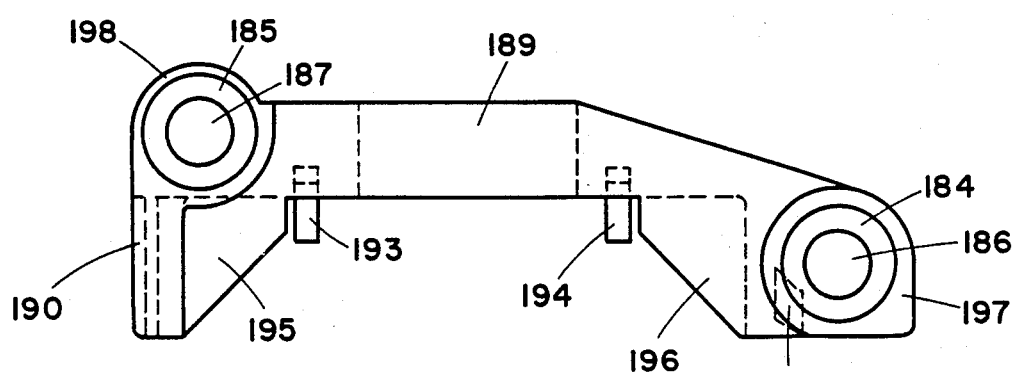

FIG. 12A
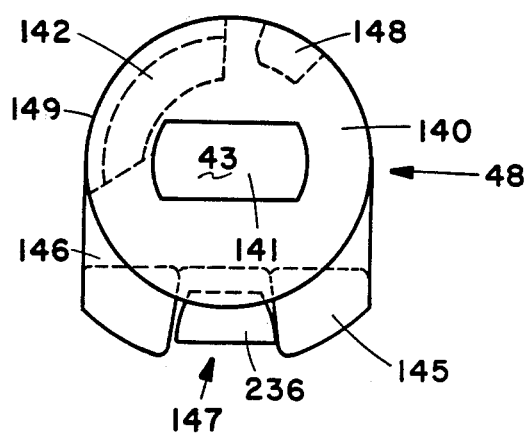
FIG. 12B
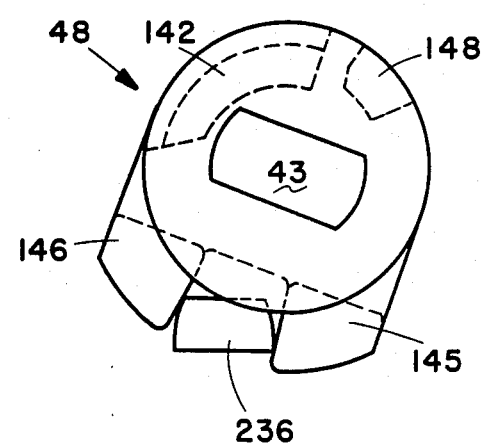
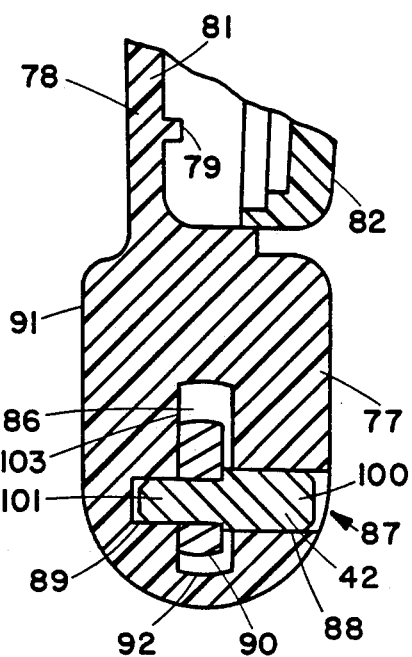
FIG. 13A
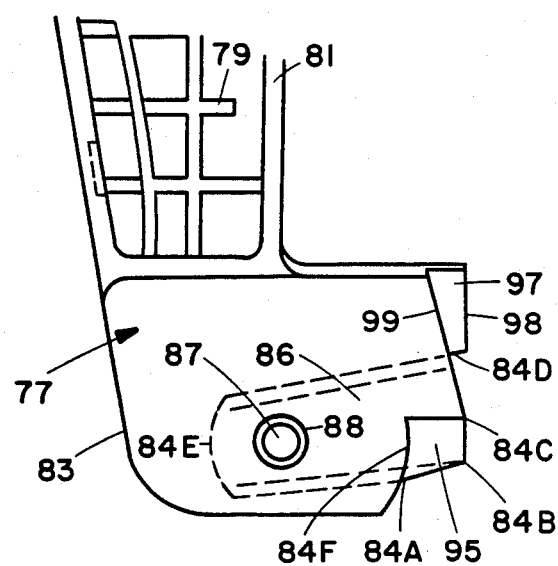
FIG. 13B

MANUALLY OPERATED ELECTROMECHANICAL SWITCH

BACKGROUND OF THE INVENTION

1. Field of the Invention.

The invention relates in general to manually operated electromechanical switches of the type used in automobiles to operate the turn signals and change the headlight beams, and more particularly, to such a switch that is momentary and which will not develop looseness even when relatively large lever arms and the relatively large resulting forces associated therein with are applied to the switch.

2. Description of the Prior Art.

Electromechanical switches that are used in automobiles to operate turn signals and change the headlight beams are well-known in the art. It is also known to use momentary type switches, that immediately return to the neutral position, for lane change indication switch functions and beam change functions. However, with respect to the turn signal functions, most if not all of such switches in the prior art are of the latching type, which latch until the steering wheel is released and then unlatch and return to the neutral position. The present invention relates to a momentary turn signal initiation switch that immediately returns to the neutral position after activation. A separate mechanism turns off the turn signals when the wheel returns, or after a predetermined time period, which separate mechanism is not a part of the present invention.

The shaft used to manually operate a turn signal or change the headlight beams is generally relatively long compared to other manually operated switches involving similar power loads. Thus relatively large leverage is applied which can result in relatively large forces on the switch parts. However, heavy switch parts not only are not economical, but also can lead to heavy wear on switch parts. Further, any looseness that is present in the switch mechanism will be greatly multiplied at the end of the lever arm. Thus a switch design which prevents looseness from developing in the operating mechanism would be very useful in such switches.

SUMMARY OF THE INVENTION

An object of the invention is to provide a manually operated momentary electromechanical switch of the type used for automotive turn signal or headlight beam change functions in which the operating mechanism does not develop looseness due to wear.

A further object of the invention is to provide the above object in a switch that absorbs any potential looseness due to wear of the parts in the return mechanism.

Another object of the invention is to provide one or more of the above objects in a switch in which looseness due to tolerance variation is minimized.

Yet another object of the invention is to provide one or more of the above objects in a switch in which the switch forces are organized so as to minimize the development of looseness in the operating mechanism.

The invention provides an electromechanical automotive switch comprising: electrical circuit means; manually operable means for activating the circuit, the manually operable means movable between a neutral position and an activate position; and return means for returning the manually operable means to the neutral position from the activate position, the return means comprising: a first cam connected to said manually operable means; at least one leaf spring; and housing means for supporting said cam and the leaf spring with the leaf spring engaged with the cam and bent by said cam a first non-zero amount when said manually operable means is in said neutral position and a second amount larger than said first amount when the manually operable means is in the activate position. Preferably, the leaf spring comprises an elongated member and the housing means comprises means for constraining both ends of the elongated member in two directions and allowing the ends to move in a third direction. Preferably, there are two of the elongated leaf spring members, the cam is sandwiched between the leaf spring members, the cam comprises a cylindrical member having two oppositely disposed flat sides parallel to the axis of the cylinder, the elongated members are substantially straight when not under stress, and the means for constraining comprises a means for holding the two elongated leaf spring members substantially parallel with the ends of one of the elongated members a distance from the ends of the other of the elongated members that is shorter than the distance between the two flat sides of the cam. Preferably the switch includes detent means for causing a change in feel in the manually operable means as it is moved to the turn signal activate position, the detent means including a second cam. Preferably, the switch further comprises stop means for stopping the movement of the manually operable means after it has been moved to the activate position, the stop means including: a stop member integrally formed with the second cam; and a means for engaging the stop member to stop the motion of the manually operable means. Preferably the manually operable means includes a lever means external of the housing for being manually contacted and a main bearing, and wherein the stop means is located between the lever means and the first cam. Preferably he manually operable means further includes low pressure contact means for contacting the electrical circuit with a contact force significantly lower than the force normally associated with limb motions of adult humans, and the stop means is located between the lever means and the low pressure contact means.

The switch according to the invention not only remains tight throughout its life, but also is highly reliable and compact. Numerous other features, objects and advantages of the invention will become apparent from the following detailed description when read in conjunction with the accompanying drawings.

BRIEF DESCRIPTION OF THE DRAWINGS

In the drawings:

FIGS. 1A and 1B together provide an exploded view of the preferred embodiment of automotive switch module incorporating the invention;

FIG. 11A is a front view of the bearing cover and turn signal detent retainer of FIG. 5;

FIG. 11B is a right end view of the retainer of FIG. 11A;

FIG. 11C is an end view of the contact means of FIG. 5 showing a single blade in profile;

FIG. 11D is a side view of the contact means of FIG. 11C;

FIG. 11E is a front view of the bearing cover and leaf spring retainer of FIG. 5;

FIG. 12A and 12B is a detail showing the interaction of the turn signal transmission "gear" members of the preferred embodiment; FIG. 13A is a cross section of the preferred embodiment of the connection between the lever and shaft taken through the line 13A—13A of FIG. 6;

FIG. 13B is a side view of the lever connecting portion;

DESCRIPTION OF THE PREFERRED EMBODIMENT

Figure 1B:
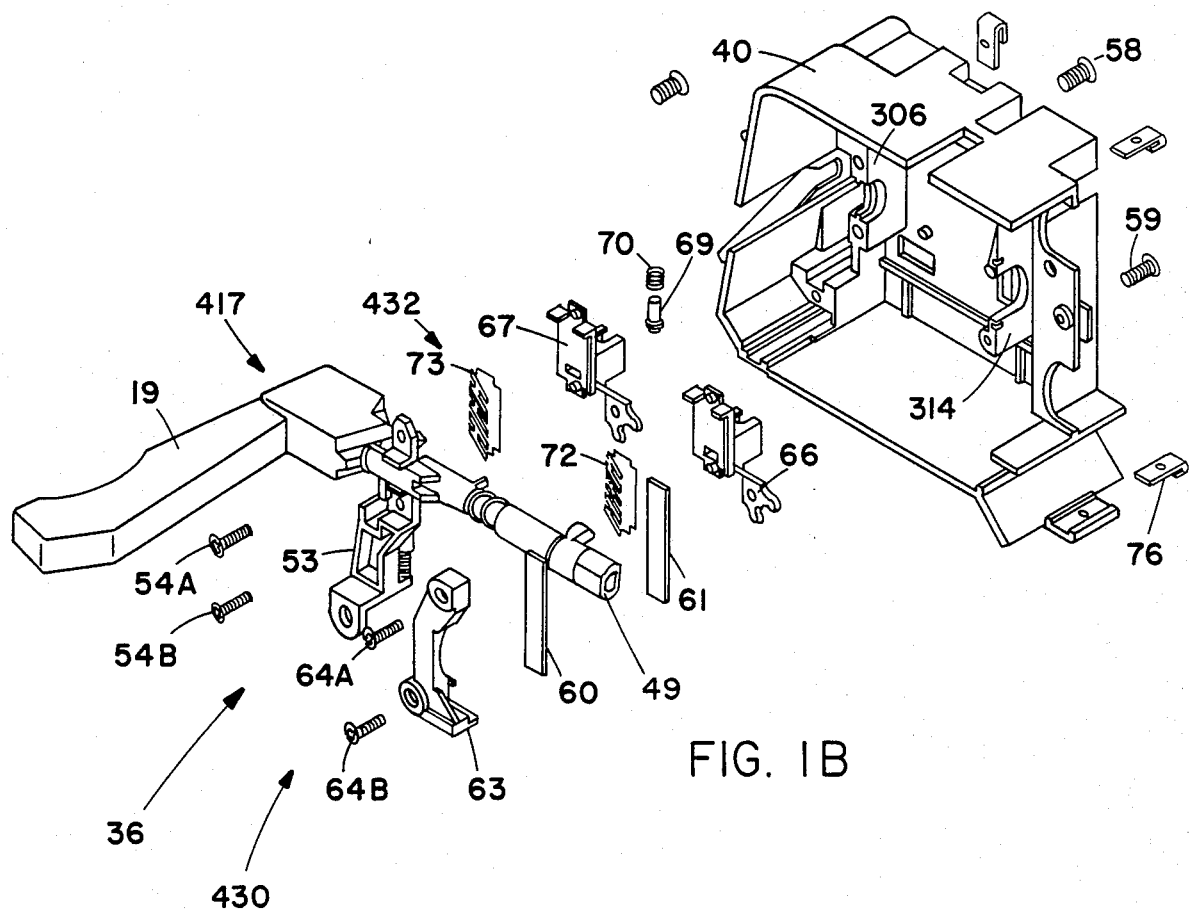

In the preferred embodiment, the switch according to the invention is part of a switch module 10 which controls the turn signal, headlight beam change, panel and interior lights and windshield washer and wiper functions. It is understood that the embodiment shown is only intended to be exemplary and not intended to be limiting of the invention. The assembled module 10 is shown in FIGS. 3A and 3B and is shown in partially exploded form in FIGS. 1A, 1B and 2. The principal subassemblies and their functions will be briefly discussed first to orient the reader to the device, and then a detailed description of each part will be presented. In this description, when the words front, back, up and down are used without specific reference to a FIG., then it is in reference to the normal position of the module in use, which is shown in FIG. 3A with the "front" facing to the lower left of the FIG.

Module 10 has two buttons 12 and 15 and two levers 16 and 17 protruding from its front cover 18 and another lever 19 extending from its left side. Button 12 is part of a "lights-on" subassembly 23 (FIG. 1A) which activates a circuit 25 on the front 26 of circuit board 27 to turn on the parking lights and headlights of the vehicle. Button 15 is part of a "lights-off" switch subassembly 29 which activates a circuit 30 on the front 26 of circuit board 27 to turn the lights off. Lever 16 is part of a panel light switch subassembly 31 which activates a circuit 32 on the front of circuit board 27 to operate the panel and interior lights of the vehicle. A light guide 33 encapsulates subassemblies 23, 29 and 31 to provide lighting for various indicia such as 34 on front cover 18. Lever 17 is part of a windshield wiper and washer switch subassembly 35 which operates the windshield wipers and washers of the vehicle. Lever 19 (FIG. 1B) is part of a turn signal and headlight beam change switch subassembly 36 which activates circuits 37 on the back 39 of circuit board 27 to operate the turn signal and headlight beam change functions of the vehicle. The invention is contained in the last-named subassembly, the turn signal and headlight beam change switch subassembly 36. This subassembly will therefore be discussed in detail below and the other parts mentioned only as they relate to this subassembly.

Figure 2:
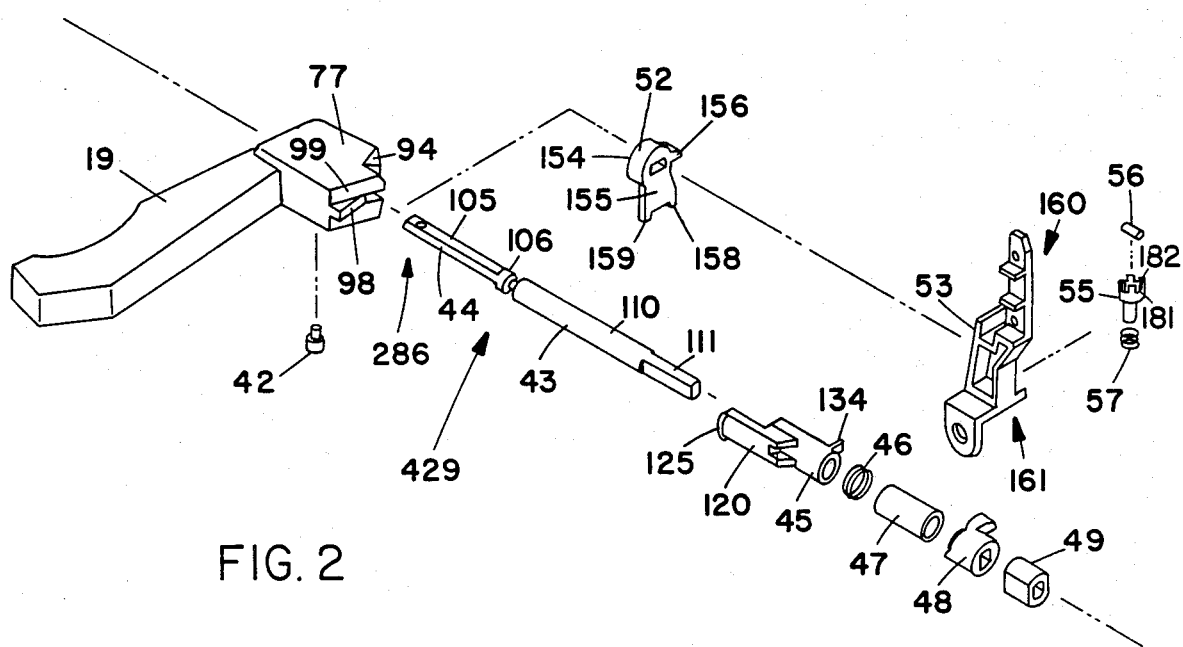
FIG. 2 is an exploded view of the manual lever and main shaft of the turn signal and headlight beam change assembly of FIGS. 1A and 1B.
Figure 3A:
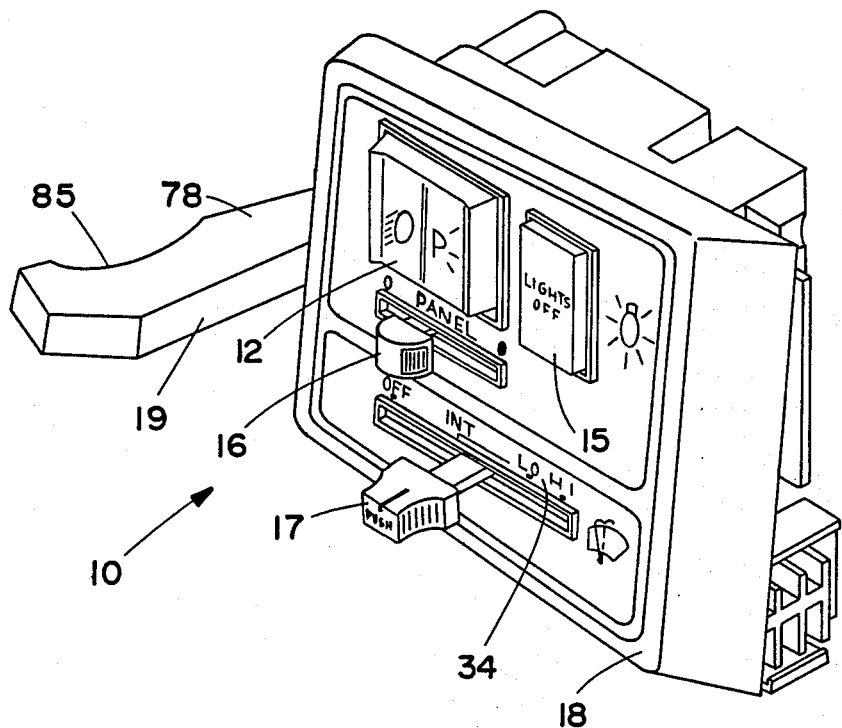
FIG. 3A is a perspective view of the assembled switch module of FIGS. 1A and 1B showing the front side of the module.
Figure 3B:
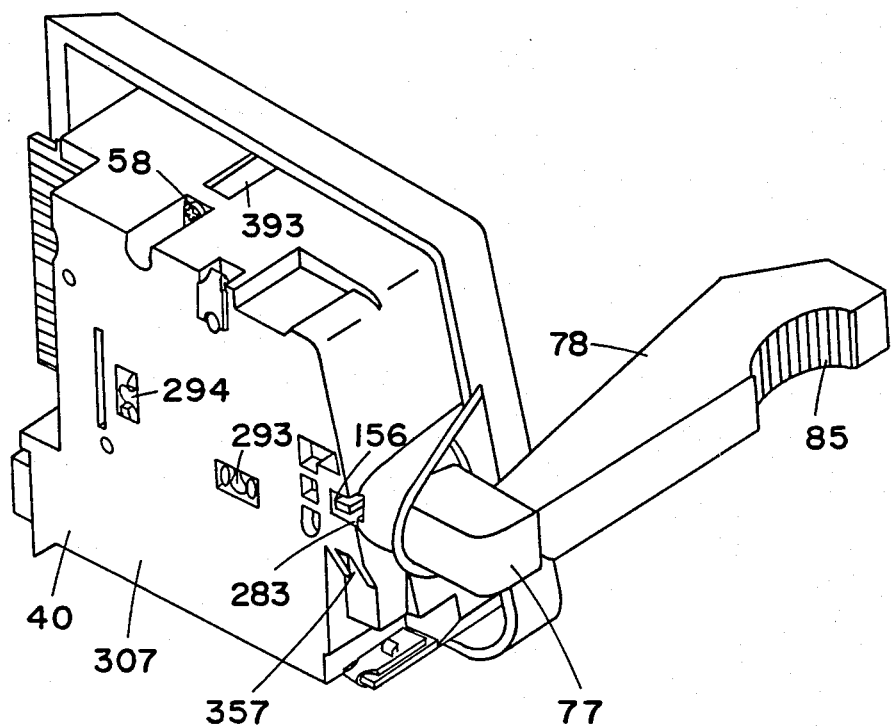
FIG. 3B is a perspective view of the module of FIG. 3 from the back side.
Figure 6:
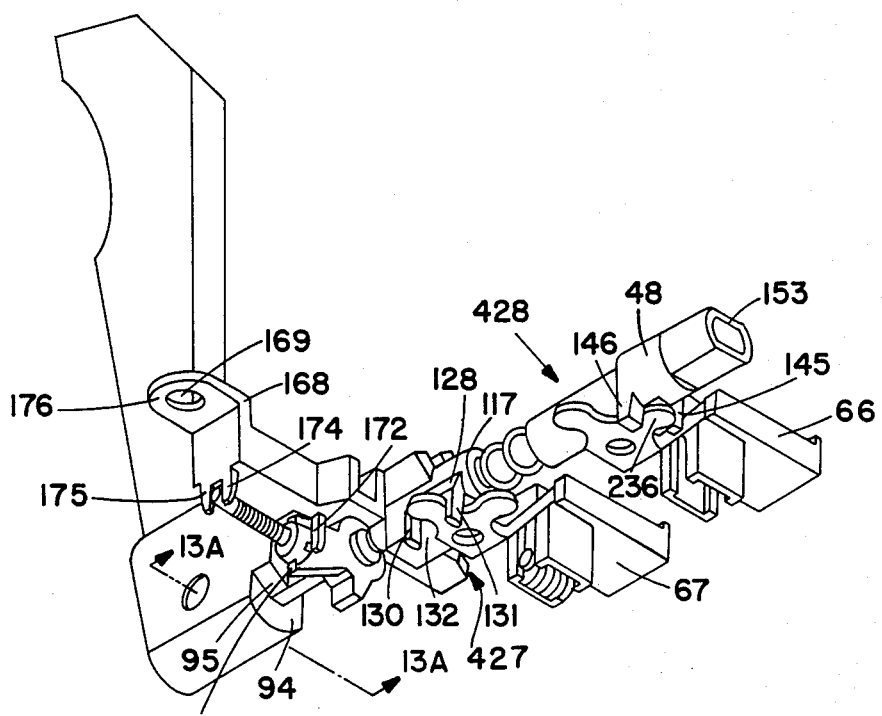
FIG. 6 shows, a back perspective view of the turn signal and beam change mechanism of FIG. 5 in the neutral position.
Figure 7:
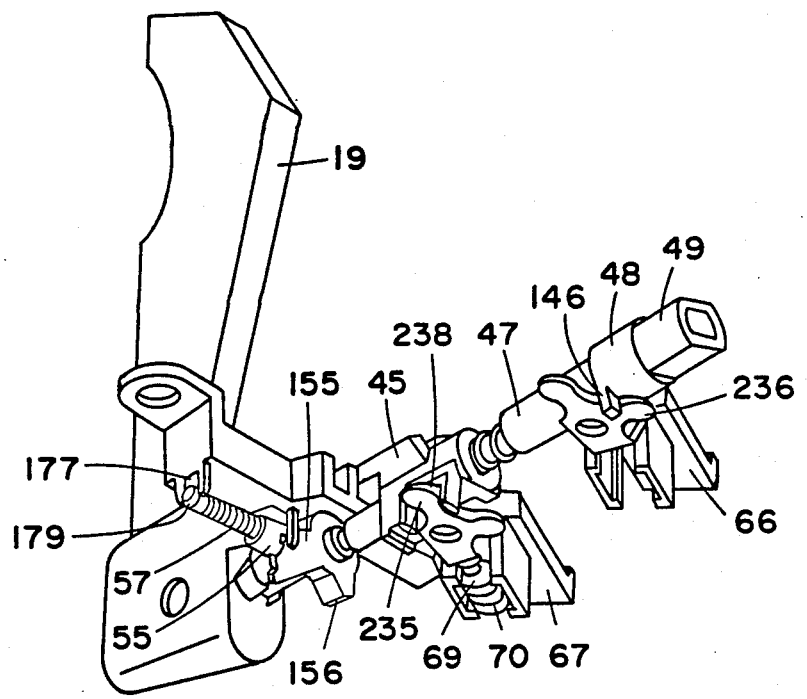
FIG. 7 shows the mechanism of FIG. 6 in the position for activating the left turn signal and beam change functions.
Figure 13C:
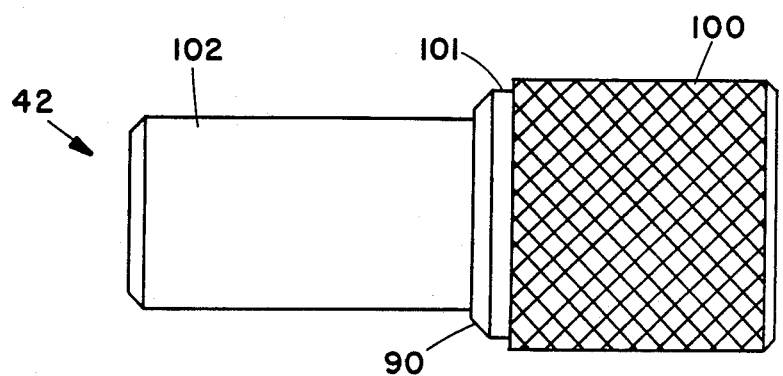
FIG. 13C is a side view of the pin connecting the lever and shaft.
Figure 14A:
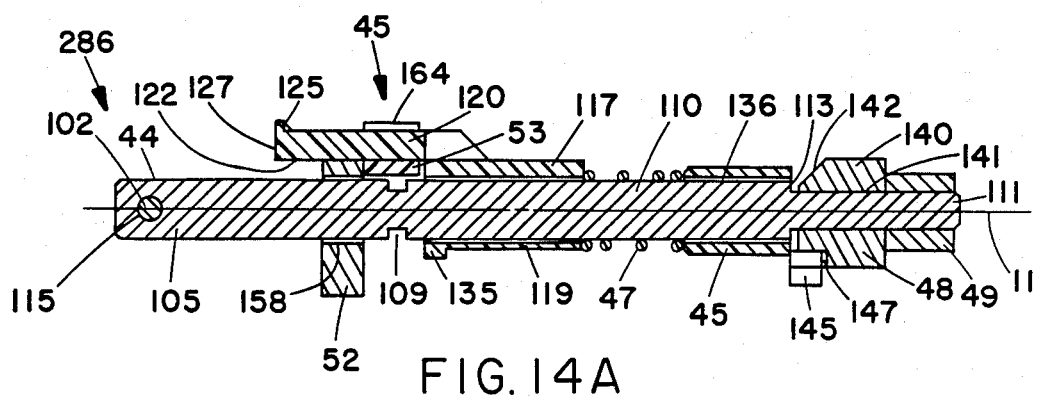
FIG. 14A is a cross section of the preferred embodiment of the shaft and associated parts taken through the line 14A—14A of FIG. 5.
Figure 14B:
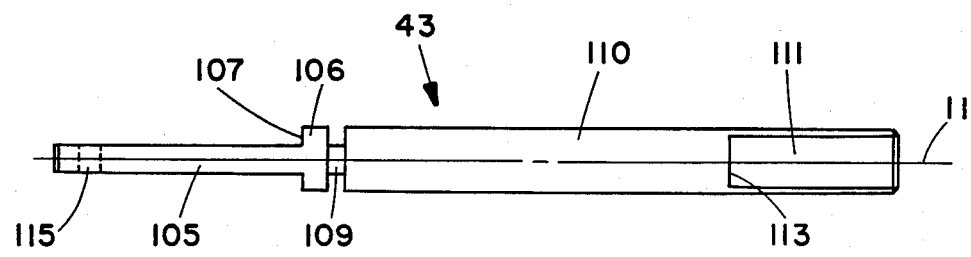
FIG. 14B is a side view of the shaft perpendicular to the cross section of FIG. 14A.

Referring to FIGS. 1A, 1B and 2, the turn signal and headlight beam change subassembly 36 includes a generally cup-shaped housing 40, lever 19, pin 42, shaft 43, beam change actuator 45, beam change return spring 46, spacer 47, turn signal actuator 48, turn signal return cam or first cam 49, turn signal detent and stop cam or second cam 52, bearing cover and detent retainer 53, screws 54A and 54B, detent plunger 55, detent roller pin 56, detent spring 57, leaf springs 60 and 61, bearing cover and leaf spring retainer 63, screws 64A and 64B, turn signal contact carriage 66, beam change contact carriage 67, beam change detent plunger 69, beam change detent spring 70, turn signal contact means 72, beam change contact means 73, circuit board 27, screws 58, 59, 75A, 75B and various clips such as 76 for mounting the module in an automobile. Lever 19 comprises a connecting portion 77 and a handle portion 78. Handle portion 78 is hollow with internal rib structure, such as 79 (FIG. 13B) for strengthening it, and comprises a generally cup-shaped body portion 81 and a snap-in cover 82. Handle portion 78 is 3.1 inches long, and in the plane of FIG. 13A tapers at 1.5° on both sides with a mean thickness of about 0.5 inches. In the plane of FIG. 13B its inner edge forms a right angle with connecting portion 77 and its outer edge angles at 9.5° from a base dimension of 0.59 inches near the connecting portion 77. It includes an arc-shaped indention 85 with a radius of 0.75 inches and having square serrations of 0.020 inches width and height spaced 0.040 inches apart, which indentation and serrations facilitate contact with the operators' fingers. Connecting portion 77 is solid and has a slot 86 and a bore 87. Bore 87 comprises a larger diameter portion 88 and a smaller diameter portion 89. Bore 87 is preferably cylindrical with portion 88 being 0.156 inches diameter and portion 89 being 0.125 inches in diameter, and the two portion being concentric and the length of the bore 87 being about 0.460 inches. The exterior dimensions of connecting portion 77 are best seen in FIGS. 13A and 13B. It is 0.550 inches wide (in the plane of FIG. 13A) and 0.780 inches high (FIG. 13B). The sides, such as 91, are vertical (in FIG. 13A) and flat. The axis of bore 87 is placed about 0.550 inches from the highest point of connecting portion 77 and about 0.60 inches from the farthest right part in FIG. 13B. The perpendicular distance from the center of bore 87 to the plane of the far left side 83 (FIG. 13B) of connecting portion 77 is 0.50 inches. Slot 86 is 0.137 inches wide in the plane of FIG. 13A and the curvature of the upper and lower sides in that plane is about a radius of 0.125 inches. In the plane of FIG. 13B, the slot 86 is best defined by the following: points 84A, 84B, 84C and 84D are 0.125 inches, 0.070 inches, 0.075 inches and 0.302 inches respectively from a horizontal line through the center of bore 87 in FIG. 13B; the upper side of slot 86 in FIG. 13B slopes 10° with the horizontal and the lower side slopes 5° with the horizontal. The surface 84D forms a stop member 84D integrally formed with cam 98. The end 84E of the slot is an arc of 0.218 inches radius from the axis of bore 87, and the curved part 84F of the other end is an arc of 0.410 inches radius from the same point. The edges of connecting portion 77 are rounded and tapered to blend with the handle 78. The end of portion 77 toward shaft 43 (to the right in FIG. 13B) has an indented portion 94, perhaps best seen in FIG. 6, to provide clearance with the housing 40 and is tapered at 95 to provide additional strength and support in the area where it meets the shaft 43. The upper portion of this same end is tapered back 15° from the vertical to form a cam member 97 which has a flat cam surface 98 and which is 0.25 inches long in the direction of handle 78 and 0.137 inches square in the other direction. The surface 99 sloped back 15° is flat (FIG. 2). Pin 42 (FIG. 13C) is preferably cylindrical with a first portion 100 of 166 inches in diameter and 0.156 inches long, a second portion 101 of 0.156 inches in diameter and 0.020 inches long, and a third portion 102 of 0.125 inches in diameter and 0.230 inches long. Both ends of the pin 42 are chamfered with a corner break of 0.015 inches, and portion 101 is chamfered with a 0.005 inch corner break. Portion 100 is finished with a 160 D.P. diamond knurl. Since bore portion 88 is only 0.156 inches in diameter, it is clear that portion 100 of pin 42 will be compress the lever material when it is driven in. Shaft 43, best seen in FIGS. 2, 14A and 14B, is roughly a cylinder of 3.611 inches in total length and 248 inches in diameter. The sides of the end nearest lever 19 are cut off flat to form a portion 105 1.06 inches long and 0.130 inches thick between the flat sides. The front surface 44 of portion 105 forms a stop engagement member 44 which forms a part of the stop engagement means 286 discussed below. The neighboring portion 106 is cylindrical to form a shoulder 107 which abuts member 52. There follows a narrower cylindrical portion 109 of 0.169 inches in diameter and 0.082 inches long, then a full 0.248 inch diameter portion 110 1.664 inches long, and finally another flat-sided portion 0.130 inches in width and 0.693 inches long, with the flat sides perpendicular to the flat sides on the other end. Shoulder 113 is formed at the juncture of portions 110 and 111. A preferably cylindrical aperture 115 of 0.1265 inches diameter is formed perpendicular to the flat sides of portion 105, 0.15 inches from the end, and through the shaft axis 11. The lever end of the shaft 43 and the junctures at shoulders 107 and 113 are chamfered at 30° for a 0.015 inch corner break and the end away from lever 19 is chamfered at 30° for a 0.10 inch corner break. The beam change stop engagement means 286 comprises shaft 43, particularly the surface 44, and the housing portions, such as bearings 280 and 282, which support it. Actuator 45 has a shaft attachment portion 117 which is cylindrical with an outer diameter of 0.380 inches, an inner bore 118 0.252 inches in diameter, and a flat side 119 that is 0.166 inches from the axis 11 of the cylinder. Actuator 45 also has an arm portion 120 which is 0.302 inches wide, 0.790 inches long from the end surface 127 to the point where it begins to slope at 45° toward cylinder 117. The top (in reference to FIG. 14A) surface of arm 120 is curved with a radius of about 0.325 inches. The lower surface 122 of arm 120 is flat and is 0.200 inches from the axis of cylinder 117. At the end of arm 120 is a roughly triangular flange 125 the upper surface of which is curved in an arc of radius of 0.375 inches about the axis of cylinder 117. The edge of flange 125 forms a continuation of cam follower surface 127. As best seen in FIGS. 6 and 7, an extension 128 which slopes down at 45° to the horizontal is formed starting 0.055 inches from the end of cylinder 117. Teeth 130 and 131 are formed at the end of extension 128. The teeth are about 0.085 inches wide in the direction parallel to the axis 11 of shaft 43 and 0.140 inches wide in the other direction and about 0.30 inches long from the point where extension 128 joins cylinder 117. They are rounded on their interior side (the side toward the axis 11) and on the outside exterior edge with a radius of 0.042 inches. The inside exterior edge is square. The notch 132 formed between teeth 130 and 131 is 0.175 inches wide. Leg 134 is formed at the rear corner of cylinder 117 opposite extension 128 to form an extension of surface 119 out to the outer diameter of cylinder 117. A rectangular lip 135 extends about 0.024 inches down (in reference to FIG. 14A) from surface 119. Lip 135 is 0.070 inches wide and as long as surface 119 is wide.

Figure 8:
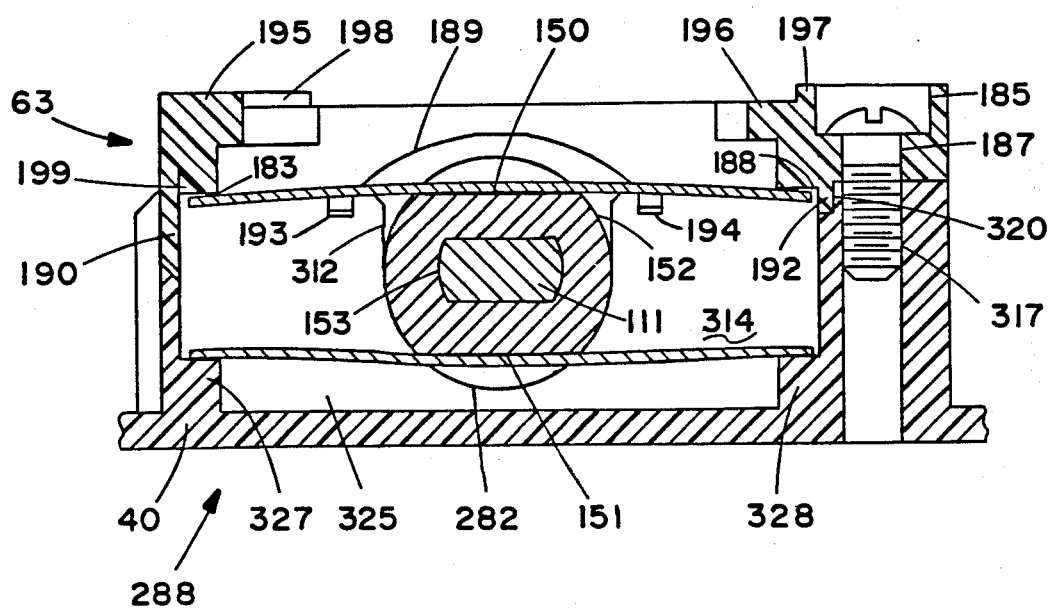
FIG. 8 is a cross section of the preferred embodiment of the lever return mechanism through the line 8—8 of FIG. 5.
Figure 9:
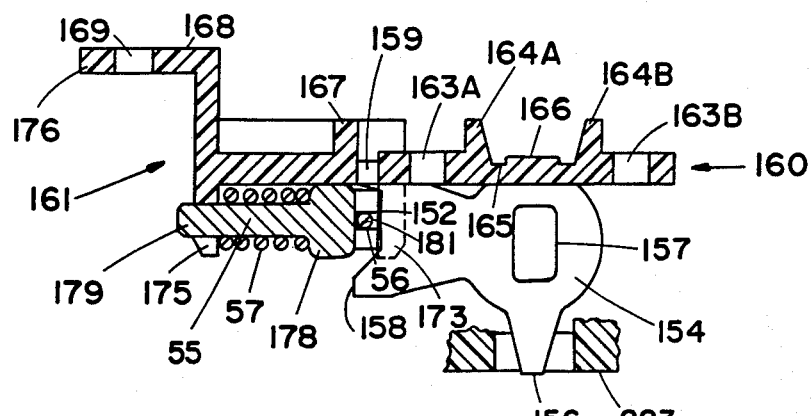
FIG. 9 is a cross section of the preferred embodiment of the turn signal and stop mechanism taken through the line 9—9 of FIG. 5.

Spring 46 is a four coil spring made from 0.034 inch diameter wire. The coil is 0.261 inches in diameter and the spring has a free length of about 0.455 inches. It compresses to 0.350 inches with a 4 lb. load, has a solid length of 0.177 inches, and a spring rate of forty pounds per inch. Spacer 47 is a cylinder 0.50 inches long and 0.370 inches in outside diameter and having an inner bore 136 of 0.257 inches in diameter. Turn signal actuator 48 comprises a cylinder 140 of 0.462 inches in outer diameter and having an inner bore 141 shaped to fit snugly on end 111 of shaft 43. The outer surface 149 (FIG. 12A) of cylinder 140 forms a bearing surface which supports the end of the shaft 43 opposite the lever 19. The cylinder 140 is cut away at 142 to assure clearance with the edge of carriage 66 as it is turned in operation. It has two teeth 145 and 146 which extend toward the back of the assembly in neutral position (FIG. 2). As shown best in FIGS. 12A and 12B, the outside edge of teeth 145 and 146 drops straight downward (in reference to FIG. 12A) from the outer circumference of cylinder 140 to a circle of 0.320 inch radius from the axis of cylinder 140. The inner side of each tooth is defined by a line parallel to and spaced 0.055 inches from a line passing through the axis 11 of cylinder 140 and 7½° from the vertical. The teeth 145 and 146 are 0.100 inches wide in the plane of FIG. 14A. The teeth 145 and 146 and a projection 148 located diametrically opposite tooth 146 extend 0.025 inches beyond the face of cylinder 140 (the projection is perhaps best seen in ghost in FIG. 14A) to form three flat surfaces which abut spacer 47. Again as best seen in FIG. 14A, the region 147 of cylinder 140 between teeth 145 and 146 is hollowed out to a depth of 0.125 inches, with the arc at the back of hollow being of 0.090 inches radius. Turn signal return cam (first cam) 49 comprises a cylinder of 0.462 inches in diameter with a bore 153 shaped to fit snugly on the end portion 111 of shaft 43, and opposing flat sides 150 and 151 (FIG. 8) parallel to the flat sides of bore 153 and spaced 0.325 inches apart. The axial length of cam 49 is 0.295 inches. The ends of bore 153 are chamfered at 30°. Turn signal detent and stop cam (second cam) 52 (FIGS. 2 and 9) has a cylindrical portion 154, a detent arm 155, and a stop member 156. Cylindrical portion 154 has an outer diameter of 0.380 inches, is 0.180 inches long, and has an inner slot-like bore 157 shaped to fit snugly on end 105 of shaft 43. Stop member 156 is defined by its sloping sides each being along a line parallel to and spaced 0.119 inches from a line passing through the axis of cylinder 154 in the cylindrical plane at an angle of 15° to the center line of slot 157. The two sides defined by the above definition slope toward each other to the blunt tip which is defined by an arc of radius 0.352 inches from the axis of cylinder 154. Stop 156 extends the width of cylinder 154 in the direction parallel to the cylindrical axis. Detent arm 155 includes two detent actuation fingers 158 and 159. As perhaps can best be seen in FIGS. 2 and 9, the detent arm 155 can be defined in the following manner: the arc 152 between the fingers 158 and 159 is along a radius of 0.515 inches from the axis of cylinder 154 and the tips of fingers 158 and 159 are along a concentric arc of radius 0.570 inches; the outer sides of the fingers are defined by lines tangent to the cylinder 154 at points along the line passing through the center of stop 156 and slot 157, and the outer sides of the main part of arm 155 are defined by lines at an angle of 15° with the tangent lines; the inner side of fingers 158 and 159 is defined by a line at a 53° angle to a line spaced 0.095 inches from and parallel to the line passing through the center of the arm 155 and the axis of cylinder 154; the final side of the fingers 158 and 159 intermediate to the tip arc and the inner side is defined by a line forming an angle 70° with a line parallel to the line bisecting stop 156 and passing through the axis of cylinder 154. The arm 155 is 0.090 inches thick, extending from the edge of cylinder 154 away from lever 19 to the center point of the cylinder. The outer surface of fingers 158 and 159 and the arc 152 is a cam surface 352 (FIG. 6) which engages the roller pin 56 of the detent mechanism. Bearing cover and turn signal detent retainer 53 (FIGS. 2, 9 and 11A) comprises a bearing cover member 160 and a detent retainer member 161. Member 160 is rectangular, being 0.270 inches wide and 0.94 inches long and 0.10 inches thick, with one corner cut off at a 22° angle sufficient to provide clearance for carriage 67 at the extreme of its pivot. Member 160 has two bores 163A and 163B centered 0.130 inches from the side nearest lever 19 and 0.135 inches from each end of member 160, with 0.67 inches between the centers. The bores 163A and 163B are each 0.125 inches in diameter. Member 160 also has two guide flanges 164A and 164B, a depressed area 165 between the flanges, and a raised boss 166 in the depression. The guide flanges 164A and 164B are each about 0.105 inches high on the side adjacent the bore and slanting down at a 16° angle a vertical distance of 0.145 inches on the inner side into the depression 165. The width of depression 165 is 0.266 inches. Boss 166 is 0.080 inches high, and is circular with a diameter of 0.150 inches, with the edge of the boss smoothly rounded. Boss 166 provides a bearing surface on which surface 122 (FIG. 14A) of actuator 45 slides and eliminates a clicking noise that would otherwise occur when actuating the beam change mechanism. The height of flanges 164A and 164B is sufficient to provide clearance between arm 119 of actuator 45 and the circuit board 27 which rests on the flanges. Detent retainer member 161 comprises a hollow box 167 having an open end, an L-shaped flange 168 having a bore 169, a wall extension 170 which forms a slot 171 with the side of box 167, and four fingers 172, 173, 174, and 175. Box 167 has a wall thickness of 0.060 inches except near bore 163A where it is radiused to provide clearance for the head of the screw that goes into the bore. Box 167 is about 0.390 inches wide at the point it joins flange 168, and the foot 176 of flange 168 extends straight back 0.270 inches then is rounded in a radius of 0.195 inches. Foot 176 is 0.070 inches thick and its lower surface is 0.40 inches from the lower surface of member 160. The other dimensions of member box 167 are defined by the following: the center of bore 169 is offset from the center of bore 163A by 0.214 inches in the direction along shaft 43 and by 0.961 inches in the perpendicular direction; the width of slot 171 is 0.140 inches and its back wall is offset from the center of bore 163A by 0.233 inches in the direction perpendicular to the axis of shaft 43. The wall of box 167 nearest lever 19 angles at 9°, and the opposite wall that connects member 160 and 161 angles at 35°. Fingers 172 and 173 are each 0.085 inches by 0.060 inches in rectangular cross section and 0.215 inches long with the side in the direction of bore 163A spaced about 0.090 inches from the center of the bore along the direction perpendicular to the axis 11 of shaft 43. Fingers 174 and 175 are each 0.080 inches by 0.065 inches in rectangular cross section and 0.225 inches long, with the slot 177 between them being 0.115 inches wide by 0.159 inches deep, the center of the slot 177 being offset from the center of bore 163A by 0.20 inches in the direction of the axis of shaft 43. The outer ends of each of fingers 172-174 are rounded in an arc of about 0.123 radius. Detent member 55 comprises a cylindrical head 178 and a stem 179. Head 178 has four teeth 180 formed by two slots 181 and 182 crossed at right angles. Head 178 is 0.248 inches in diameter and 0.220 inches in length, including the teeth 180. Slot 181 is 0.0625 inches in width and rounded at the bottom with the same radius; it is 0.067 inches deep including the radius. Slot 182 is 0.135 inches wide and 0.078 inches deep. Stem 179 is 0.115 inches in diameter and 0.426 inches long. The edge of head 178 near stem 179 is rounded in a 0.030 radius. The stem 179 is chamfered for a 0.01 inch length at both ends. Pin 56 is a cylinder 0.0625 inches in diameter and 0.230 inches long with both ends chamfered with a 0.005 inch corner break. Spring 57 is a coil spring made of 0.024 diameter music wire. Its coils are 0.120 inches in inside diameter and it has a free length of 0.418 inches and a spring rate of 24 lbs./inch.

Figure 10A:
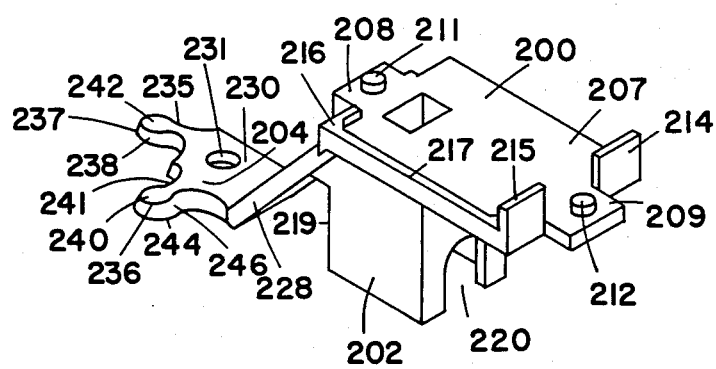
FIG. 10A is an expanded perspective view of the preferred embodiment of the contact carriage.
Figure 10B:
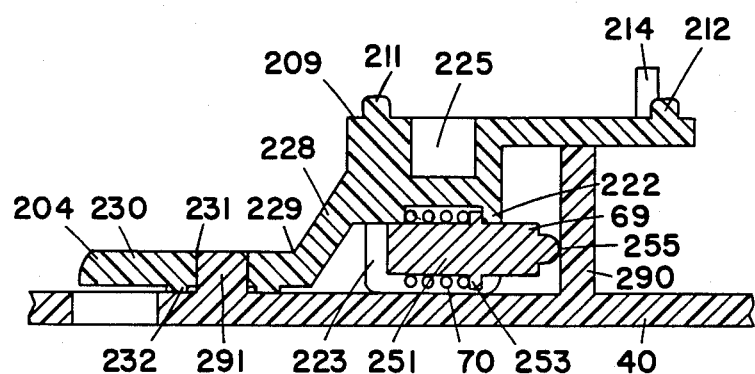
FIG. 10B is a cross section view of the contact carriage and associated parts taken through line 10B—10B of FIG. 5.

Turning now to the parts shown exploded in FIG. 1B, leaf springs 60 and 61 each comprise an elongated member 1.330 inches in length, 0.262 inches wide, and 0.022 inches thick. The corners are rounded with a 0.050 inch radius. Bearing cover and leaf spring retainer 63 (FIGS. 1B, 8 and 11E) comprises a roughly C-shaped member (see FIG. 11E) of width 0.49 inches from front to back of the "C", 1.665 inches long from top to bottom of the "C", and 0.177 inches thick. It includes countersunk bores 184, 185, 186 and 187, an arch 189 to provide clearance for actuator 48, a flange 190, a nub 192 and L-shaped brackets 193 and 194 which create a pocket for leaf spring 60, braces 195 and 196, rims 197 and 198 which provide a seat for circuit board 27 and indentation 199 which precisely locates one point of contact of leaf spring 60 and cover 63. Bores 184 and 185 are 0.250 inches in diameter and 0.097 inches deep; bores 186 and 187 are 0.125 inches in diameter and 0.080 inches deep; arch 189 is 0.080 inches deep and is formed by a flat area at the top of the arch which is 0.10 inches wide meeting a 0.470 inch radius arc on either side; flange 190 is 0.083 inches long, 0.030 inches thick, and 0.290 inches wide and its tip is beveled at 45°; nub 192 is diamond shaped, as best seen in FIG. 11E, and is 0.150 inches long in the vertical direction of FIG. 11C and its narrow vertices are 45°; L-shaped brackets 193 and 194 are 0.050 inches wide in the horizontal direction in FIG. 11E, and extend 0.093 inches beyond the inner edge of the "C" (downward in FIG. 11C) and drop 0.065 below the lower side of the main part of the member 63 (in FIG. 8). The long part of the "L" is about 0.048 inches thick at the point it joins the short part of the "L" and slopes forward at 8° over the 0.093 inch length; bracket 194 is located 0.445 inches from the axis of bore 186 and bracket 193 is located 1.110 inches from the same axis, both distances being in the horizontal direction in FIG. 11E. Braces 195 and 196 each angle back at a 45° angle from the tip of the "C" until within 0.020 inches of the adjacent brackets, 193 and 194 respectively, then drop into the inner edge of the "C" in a direction parallel to the brackets, and are 0.075 inches thick; rims 197 and 198 are both raised 0.020 inches above the adjacent surface; and indentation 199 is 0.025 inches deep and angles in at 30° to the adjacent surface, its point being rounded with a 0.015 inch radius. Screws 54A, 54B, 64A and 64B are No. 4-24 Phillips TM round-headed screws with self taping threads ⅝ inches long. Carriages 66 and 67 are preferably identical, thus only one shall be described. Carriage 66 (FIGS. 10A and 10B) comprises three principal parts, a contact seat 200, a detent housing 202 and an actuator engaging member 204. Contact seat 200 comprises a table 207 which is 0.660 inches long by 0.530 inches wide. Extensions 208 and 209 are formed at either end, with pins 211 and 212 respectively formed in the extensions. Flanges 214 and 215 are formed on either side of extension 212, are 0.125 inches high and 0.045 inches thick and go to the edge of table 207. A rim 217, 0.045 inches thick and 0.050 inches high, is formed along an edge of table 207 from flange 215 to extension 208, the corners being formed with a 45° locator plaza, such as 216. Extensions 208 and 209 are 0.240 inches wide and extend 0.086 inches from the end of table 207. Pins 211 and 212 are 0.730 inches center-to-center and are otherwise located symmetrically on the extensions 208 and 209 and are 0.062 inches in diameter and 0.050 inches high. Detent housing 202 comprises a rectangular box having interior dimensions of 0.215 inches deep and 0.212×0.190 inches square and having an open end facing away from table 200. One end 219 of housing 202 is aligned with the end of extension 208. End 219 and the opposite end have notches 220 and 221 therein which each are 0.131 inches wide and 0.170 inches deep with the closed end curved a 0.063 inch radius. The side walls and the end wall 222 about notch 220 are 0.050 inches thick while the end wall 223 about notch 221 is 0.210 inches thick. A cavity 225 0.170 inches square is cored in table 200 and housing 202 to reduce the weight of the carriage. A flange 228 is 0.280 wide and 0.070 inches thick and connects engaging member 204 to the table/detent housing structure. Engaging member 204 comprises a plate 230, a bore 231, a ring 232 on the lower surface of plate 230 about bore 231, and two pivot arms 235 and 236. Flange 228 is of a length and angle which places the center of bore 231 0.35 inches from the back edge 219 of detent housing 202 and the surface of ring 232 0.490 inches from the top of table 207. The center of bore 231 is also 0.20 inches from the end 229 of flange 228. Arms 235 and 236 each comprise a cup-shaped engaging portion 240 and a neck portion 241. Engaging portion 240 is circular in the plane in which arm 236 pivots about bore 231, with an engaging rim 244 of 0.170 inches diameter. The height of cup-shaped portion 240 is 0.09 inches between the flat top and bottom surfaces, the side 246 of the cup between the flat top and bottom surfaces is arcuate, with the radius of the arc being the same as the diameter of the rim 244, or 0.170 inches. The bore 231 is 0.125 inches in diameter within ring 232 and 0.122 inch diameter within plate 204. The neck area 241 of arm 236 is formed by a 0.085 inch radius circle along the upper surface of plate 230 (on both sides of the neck 241) and a 0.061 inch radius circle along the lower surface of plate 230, and the side of the neck 241 tapers to join the two circles. The structure of arm 235 is similar except that the diameter of the engaging rim 237 and the radius of arc of the cup side 238 is 0.180 inches. The distance from the axis of bore 231 to the axis of cup 240 is 0.260 inches while the analogous distance for arm 235 is 0.276 inches. Carriage detent 69 comprises a cylinder 251 of 0.125 inches diameter with a circular ring 253 of 0.187 inches diameter girdling it and a projection 255 on its end. Projection 255 has a spherical end of 0.031 inches radius and extends 0.050 inches from the end of cylinder 251. Ring 253 begins 0.170 inches from the tip of projection 255 and is 0.30 inches wide. The length of the detent from the tip of projection 255 to the bottom of the cylinder 251 is 0.40 inches. Spring 70 is preferably made of 0.015 diameter music wire with 0.25 inches of free length, 4 turns, and having an inside coil diameter of 0.150 inches. It provides 275 grams of bias force when compressed to 0.140 inches. Low pressure contact means 72 and 73 (FIGS. 1B, 5, 11C and 11D) are identical and each comprise: a mounting plate 260; flanges 261 and 262 with bores 263 and 264 respectively; and three pairs 266, 267 and 268 of contact blades. Each pair of contact blades is joined by a cross-bar such as 270 and each blade, such as 271, has a contact, such as 272. FIG. 11C shows a single blade in profile. The contact means is integral being made of metal 0.010 inches thick. Plate 260 is 0.375 inches wide by 0.590 inches long and its two corners nearest the contacts 272 are cut at 45° taking off 0.050 inches of the corner to provide a key used in assembly. Flanges 261 and 262 are each 0.140 inches wide by 0.218 inches long and the center of each flange is located 0.210 inches from the keyed end of the plate 260; the bore 263 is centered in the flange and has a diameter of 0.067 inches, while bore 264 is 0.085 inches along an axis passing through both bores and each end is rounded with a 0.067 inch radius. The contact pairs are identical with pairs 266 and 268 located at their respective ends of plate 260 and pair 267 centrally located. Each blade, such as 271, is 0.050 inches wide and the blades in each pair are separated by 0.030 inches. The blades such as 271 are each 0.420 inches long from the end of the contact to the tip of the bend 274. The tip of the bend 274 extends 0.045 inches from the edge of plate 260. Each cross-bar, such as 270, is 0.040 inches wide and is located 0.160 inches (in the flat state) from the tip of bend 274. Each contact, such as 272, is formed by three bends, one upward (in FIG. 11C) at 275 and having a 0.015 inch radius, the second to form the horizontal cup in FIG. 11C having a 0.080 inch radius, and the third to form the horizontal cups in FIG. 11D being of a 0.030 inch radius. This results in a contact 0.050 inches wide (in the plane of FIG. 11D) and 0.015 inches high. The bend 274 is a 0.030 inch radius to provide a free contact height above the bottom of plate 260 of 0.175 inches. The working contact height is 0.135 inches. The grain direction is preferably in the horizontal plane of the drawing in FIG. 11C.

Clips, such as 76, (FIG. B) are conventional threaded mounting clips, for #6 screws, such as the high carbon spring steel clips made by Eaton Corp., Cleveland, Ohio. Housing 40 is shown in FIGS. 1B, 3A, 3B, 4A, 4B, 5, 8, 9, and 10B. Many details of the housing are determined by conventional assembly requirements or specifications of a particular customer to integrate the module with its system, and thus will not be discussed. The portions relevant to the invention include main bearing 280, right bearing 282, turn signal stop engagement means 283 (FIGS. 3B and 9), leaf spring support means 288, turn signal detent guide and support 289, beam change detent member 290, carriage pivots pins 291 and 292, windows 293 and 294 and circuit board supports and location means 297. Main bearing 280 comprises a bearing surface 300 of 0.2505 inches diameter at the bottom of a slot 302 of the same diameter and the same depth. This surface is divided into two surfaces, the left being of width 0.130 inches and the right being of width 0.14 inches, by a wedge-shaped rib 304 of a diameter of 0.76 inches, a width at its base of 0.076 inches and tapering upward and inward at an angle of 15°. Bearing surface 300 and rib 304 are formed in a main bearing support 306 that is roughly rectangular, being 0.940 inches long, 0.280 inches wide, and the top surface of which is spaced 0.505 inches from the back surface 307 of the housing 40. Bores 309 and 310 are formed in support 306 spaced 0.375 inches from the axis 11 of bearing surface 300, the bores being of about 0.089 inch diameter, suitable for receiving screws 54A and 54B. Bearing 282 is of a diameter of 0.463 inches in a slot 312 of the same diameter and a depth of 0.387 inches. The top inner corner of the slot 312 is tapered outward at 45° from a distance of about 0.04 inches from the top. The bearing 282 is formed in a right bearing support 314 that is 0.200 inches wide in the area of bearing 282 and tapers at an angle of 18° from the side of slot 312 to provide clearance for carriage 66. Indentations, such as 316, are formed on either side of slot 312 on the outer wall of support 314 to provide clearance for brackets 193 and 194, the indentations being about 0.05 inches square. Bores 317 and 318 are formed in support 314, bore 318 being spaced 0.80 inches from the axis of bearing 282 and bar 317 being spaced 1.365 inches from bore 318 in a direction perpendicular to the axis. The spacings along the axis o these parts are perhaps best given with respect to pivot pins 291 and 292. Pins 291 and 292 are 0.120 inches in diameter and are 0.110 inches high. They are located along the bearing 280 and 282 and shaft 43 axis spaced 0.885 inches apart center-to-center with pin 291 being 0.595 inches from the center of rib 304 and pin 292 being 0.420 inches from the inner side of right bearing 282. In the direction of the bearing axis 11, bores 317 and 318 are 0.480 inches and 0.760 inches respectively from the center of pin 292. The support 314 makes a radius of 0.160 inches about the center of bore 318 and blends with the 18° angle side on one end of the radius and continues to the housing wall 321 in a direction parallel to the bearing axis 11. The support 314 includes a 0.140 inch radius post portion about bore 317 which post blends smoothly with the support wall. A notch 320, 0.070 inches wide and extending from the housing wall 321, parallel to the bearing axis 11 to within, 0.050 inches of a line perpendicular to the axis 11 through the center of bore 318 and then continuing to the inner edge of support 314, forms a cavity 320 to receive nub 192. A wall 323,0.030 inches thick and 0.215 inches high connects housing wall 321 and support 314. This wall 323, the housing wall 321 and the inside of bearing support 314 form a rectangular cavity 325 which is 1.350 inches long and 0.315 inches wide at the bottom of the bearing support. At the bottom of the cavity are two benches 327 and 328 (FIG. 8) which comprise the leaf spring support means 288. Bench 327 and bench 328 are both 0.075 inches wide and 0.090 inches high and extend the width of the cavity 325.

Figure 4A:
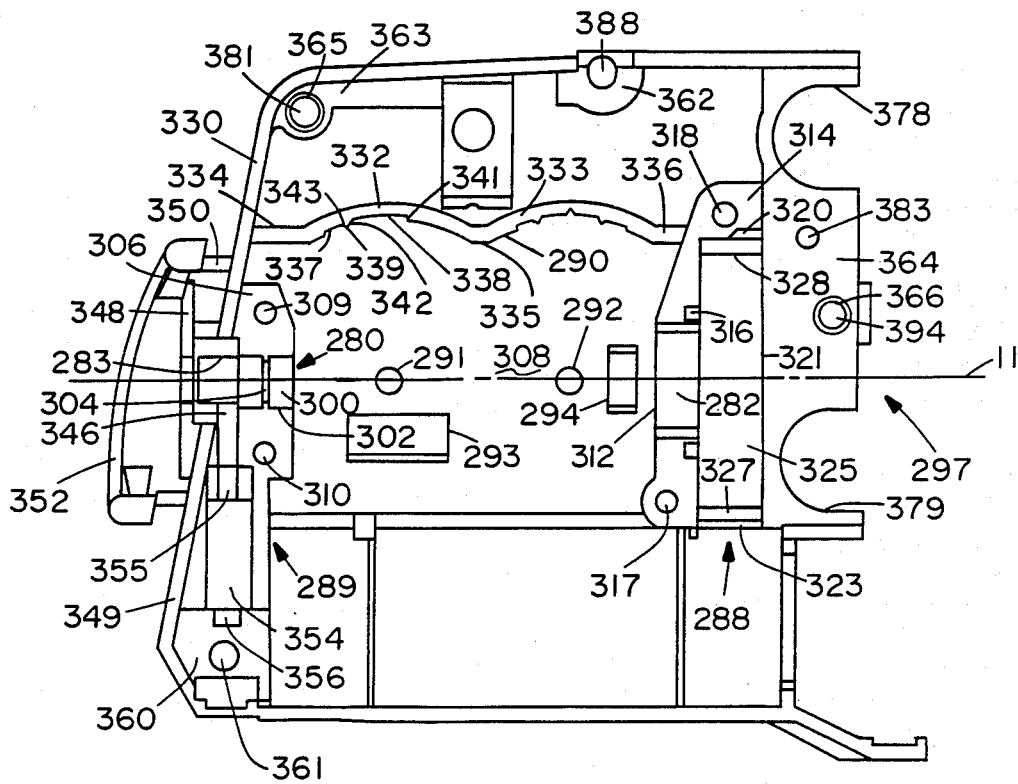
FIG. 4A is a front view of the module housing back portion.
Figure 4B:
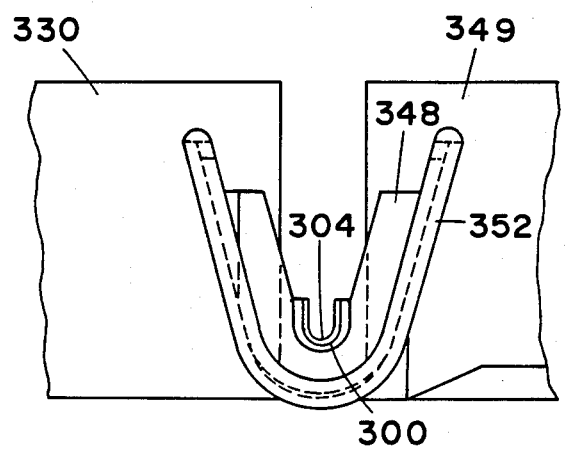
FIG. 4B ia a partial side view of the housing FIG. 4A.
Figure 5:
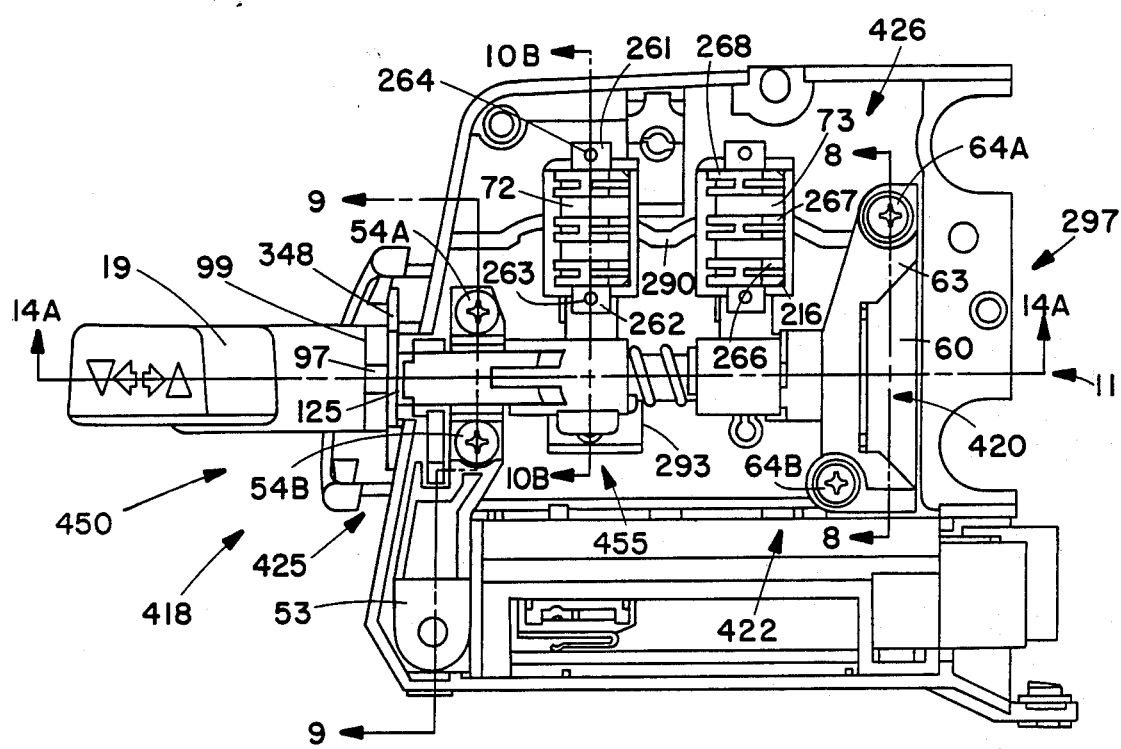
FIG. 5 shows the turn signal headlight beam change mechanism of the embodiment of FIGS. 1A and 1B in the housing of FIG. 4.

Beam change detent member 290 comprises: a rib 0.075 inches thick and 0.420 inches high extending across the housing 40 from bearing support 314 to wall 330. The rib comprises: two arcs 332 and 333, the inner wall of which forms a 0.770 inch radius from the center of pins 291 and 292 respectively; short straight segments 334, 335 and 336 join the two arcs in the center and to the wall 330 at one end and the support 314 at the other end, the location of these segments being defined by their inner wall being approximately 0.675 inches from the bearing axis 11. The arc 332 is shown in FIG. 4A. It includes two indented arc segments 337 and 338 and a detent ramp 339. Segment 337 is indented 0.010 inches from the inner surface of the arc 332 and segment 338 is indented 0.035 inches. The sides 341, 342 and 343 of the indentation and ramp are formed 30 °, 45° and 60° respectively with the radius of the arc 332. Turn signal stop engagement means 283 comprises an aperture in the housing 40 which is 0.2505 inches square. The bearing support 306 is continued in to join wall 330 at the upper side of the bearing axis 11 and the wall is continued to the trim wall member 348 to form the upper stop member which engages stop 156 and stops the lever from being moved more than 15° downward; a wedge 346 (FIG. 4A) 0.174 inches high and 0.296 inches long which is turned at a full 0.174 inch radius near the bearing axis 11 then slopes at 30° provides the lower stop member which engages stop 156 and prevents the lever from being turned more than 15° upward. A partial side view of housing 40 is shown in FIG. 4B. This shows the V-shaped trim wall member 348 which is 0.060 inches thick except on the right side in the FIG. where it is integrally molded with the housing wall 349, and thus is about 0.160 inches thick. The vertice of the inner edge of the V is a 0.135 inch radius with the sides being spaced 0.110 inches from a line passing through axis 11 and making a 15° angle with the vertical in FIG. 14B. The outer side of the V is connected to sidewall 350 which is about 0.07 inches thick, thereby attaching trim wall member 348 to the wall 330 of housing 40. The inner vertices of sidewall 350 as well as the lip 352 are sloped at 15° and spaced wide enough so as to be just beyond the throw of lever 19. Otherwise the dimensions of these parts do not pertain to the invention. Turn signal detent guide and support 289 comprises a cavity 354 and three slots 355, 356 and 357 (FIG. 3B). Cavity 354 has a circular bottom with a diameter of 0.253 inches, a width and depth of the same diameter, and a length of 0.693 inches. Slot 355 is centrally located in the wall of cavity 354 parallel to and nearest the bearing axis 11. Thus slot 355 is rectangular, and is 0.140 inches wide, and extends down into and connects with slot 357. Slot 357 is an opening in the bottom of cavity 354 at the end nearest slot 355 and is approximately 0.153 inches long (along the length of the cavity 354) and the same width, 0.140 inches, as slot 355. Slot 356 is formed in the wall of cavity 354 farthest from and parallel to the bearing axis 11. It has a circular bottom of diameter 0.117 inches, turned about the same center as the bottom of cavity 354, and a width of the same 0.117 inches. It extends 0.373 inches beyond the tip of cavity 354 length of the entire housing wall to form a notch in seat 360. The wall of cavity 354 in which slot 356 is formed, as well as seat 360, are 0.050 inches thick, while the interior wall of cavity 354 is 0.060 inches thick. Seat 360 is 0.250 inches long and extends the entire width of the cavity 354 to the housing wall 349. A 0.125 inch diameter hole 361 is located centrally between the notch formed by slot 356 and the other side of the seat. As thus formed, turn signal detent guide and support 289 serve as a receptacle for the detent retainer member 161 with fingers 172 and 173 slidably engaging the wall on either side of slot 355, fingers 174 and 175 slidably engaging the walls on either side of slot 356, and the foot 176 of flange 168 seating on seat 360. Slot 355 provides a passage for detent arms 155 and slot 357 provides maneuvering room for detent fingers 158 at the extreme downward end of the stroke of lever 19. Slot 356 provides maneuvering room for the end of the stem 179 of detent plunger 55 when the detent is engaged. The rigidity of the guide and support 289 also provides additional support for the member 161 when they are under stress. Windows 293 and 294 are rectangular apertures formed in back wall 307 of housing 40. Window 294 is 0.210 inches wide by 0.460 inches long and is located 0.230 inches from the center of pin 292 and centered on the plane of the shaft and bearing axis 11. Window 293 is 0.520 inches long and 0.200 inches wide and located 0.145 inches from the plane of the bearing axis 11, the end closest to lever 19 being 0.200 inches from a line perpendicular to the bearing axis plane through the center of pin 291. Circuit board supports and locator means 297 include the front surface of detent retainer member 164, the rims 197 and 198 on bearing cover 63, the ends of flanges 164A and 164B, and the front of bearing cover member 160, posts 362, 363 in housing 40, and flange 364. Cylindrical locator rims 365 and 366 extend 0.050 inches above the top of surface of post 363 and flange 364 respectively. Rim 365 fits snugly into 0.094 inch radius indentation 368 on circuit board 27, and rim 366 fits snugly in 0.188 inch diameter hole 369 in circuit board 27. The wall of the housing 40, such as at 330, is typically 0.07 inches thick where not specified above.

Figure 15:
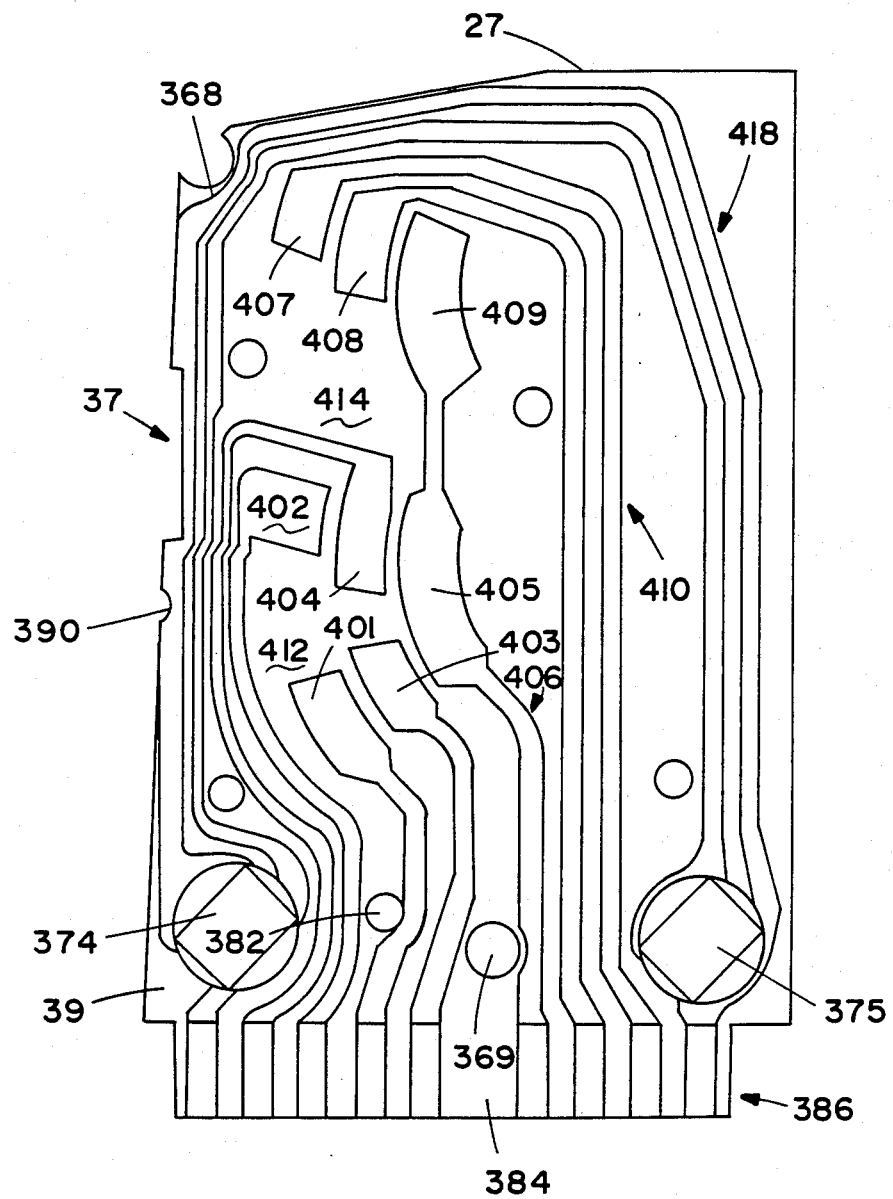
FIG. 15 is a back view of the turn signal and beam change circuit board of the preferred embodiment.

The back 39 of circuit board 27 is shown in FIG. 15. The board 27 is shaped to fit within housing 40 between walls 330, 370 and flange 372. The bottom side in FIG. 15 is designed to extend out over flange 364 with light sockets 374 and 375 passing through U-shaped notches 378 and 379 respectively in the flange. The circuit board 27 is fastened to housing 40 by No. 4 sheet metal screws 75A, 75B, 58 and 59. Screw 75A passes through light guide assembly 33 and indentation 368 on circuit board 27 to screw into bore 381 in post 363 of housing 40. Screw 75B passes through light guide assembly 33 and hole 382 in circuit board 27 and screws into threaded bore 383 in flange 364. Screw 58 (FIG. 3B) passes through opening 388 in housing 40 and indentation 390 in circuit board 27 and screws into a bore in post 393 of housing cover 18. Screw 59 passes through a connector (not shown), which fits over end 384 of circuit board 27 and connects to the traces 386 of the circuit board; then the screw 59 passes through bore 394 of flange 364 then through hole 369 in circuit board to screw into a bore in a post in cover 18. Circuit board 27 includes traces 401 through 405 which the contacts on contact means 72 of carriage 66 contact to activate the circuits 406 of which the traces are a part, and also includes traces 407–409 which the contact pairs 268, 267, and 266 respectively on contact plate 260 of carriage 67 contact to activate the circuits 410 of which the traces are a part. Traces 386, 401–405 and 407–409, are formed on the circuit board by conventional screening and etching techniques and are preferably 2-ounce copper.

It is understood that the dimensions given herein are those used for the specific embodiment described to assist the reader in building the invention. However, the invention is not limited by the specific dimensions provided. The preferred materials of which the various parts are made follow, but again it is understood that thee materials are given only as exemplary and preferred, and the invention may be constructed out of many other materials. Front Cover 18 is made of ABS plastic. The housing 40, carriages 66 and 67, bearing cover and detent retainer 53, and bearing cover and leaf spring holder 63, are made of 6/6 Nylon TM plastic with 25% mineral and 15% glass content; the lever 19 is made of 6/6 Nylon TM plastic with 33% glass filler; the circuit board 27 is 0.062 inch General Electric TM PC 75; shaft 43 is 0.25 inch B12L14 leaded steel rod; spacer 47 may also be the above steel or die cast zinc alloy with 0.73 post plating. Beam change actuator 45 is Celcon TM plastic; the turn signal actuator 48, leaf springs cam 39, and turn signal detent and stop cam are made of powdered metal iron carbon MPIF specification No. F-0008-R, oil impregnated 75% with density of 6.4 to 6.8 g/cm$^2$ and the first two having hardness of 70–85 on a 15T scale and the last having hardness of 75–95 Rb; springs 46, 57 and 70 are music wire that is phosphorus pre-coated; lever pin 42 is 0.156 diameter steel rod C12L14 alloy; roller pin 56 is AISI 50100, 51100, 52100 steel hardened and tempered to RC 60–64; turn signal detent plunger 55 and beam change detent plunger 69 are F.M. brass CDA alloy 36, ½hardness; leaf springs 60 and 61 are C1095 blued clock spring steel quenched and tempered and polished, Rockwell C-48 to 51; clips such as 79, are 0.025 high carbon spring steel, screws 54A, 54B, 64A and 64B are steel; screws 58 and 59 and 75A and 75B are steel; and contact means 72 and 73 are CDA 260 brass, spring tempered to a tensile strength of 91,000 to 100,000 psi. In addition, parts such as pivot pin 291 and 292 and the other thrust bearing areas of carriages 66 and 67 and the detent plungers 55 and 69, cams 49 and 52, actuators 45 and 48 and the contacts on means 72 and 73 are lubricated with a light grease such as type 723G available from William F. Nye, Inc. of New Bedford, Mass.

The turn signal and headlight beam change subassembly 36 is assembled as follows. The second cam 52, bearing cover and retainer 53, beam change actuator 45, spring 46, spacer 47, turn signal actuator 48 and first cam are inserted on shaft 43 in the order given and placed in the positions shown in FIGS. 5 and 14A and the end of shaft portion 111 and cam 52 are staked on opposite ends to hold all the parts on the shaft 43. Cover 82 is snapped onto body 81 of lever 19 and end portion 105 of shaft 43 is inserted in slot 86; pin 42 is inserted in bore 88 in lever connecting portion 77, through aperture 115 in shaft 43 and into bore 89 in the lever 19; the pin is pressed in with a force sufficient to cause shoulder 90 of pin 42 formed at the juncture of portion 102 and portion 101 to engage shaft portion 105 and push it up against wall 103 of slot 86 and portion 100 to compress the plastic of lever 19. This plastic is strong and sufficiently rigid to transmit the actuation forces required and sufficiently deformable and resilient to compress under the stated insertion force. This insertion is chosen to provide zero clearance between shaft 43 and the wall 103 of slot 86 and at the same time allow the shaft 43 to pivot without binding in the slot about pin 42 under normal manual force exerted on lever 19. The knurled finish on portion 100 causes the portion to grip the plastic of the walls of bore 88. The parts as described above are such that the predetermined insertion force will drive the end of portion 88 in flush with or below the surface of lever connecting portion 77. The force with which pin 42 is pressed into bore 87 is preferably 25 lbs. Spring 70 is then slipped over beam change detent plunger cylinder 251 and the plunger 69 is inserted into notches 220 and 221 in carriage 67 with spring 70 compressed between ring 253 and the walls 223, and ring 253 engaging wall 222. The carriage 67 is placed in housing 40 with bore 231 over pin 291 and contact seat 200 resting on rib 290. Carriage 66 is likewise placed in housing 40 with its bore over pin 292 and its contact seat resting on the rib 290. Spring 57 is placed on stem 179 of turn signal detent plunger 55 and roller pin 56 is inserted into slot 181 and spring 57 is compressed while slipping stem 179 into slot 177 between fingers 174 and 175 of detent retainer 161, then head 178 is slipped behind fingers 172 and 173 with arc 152 of cam 52 fitting into slot 182. Leaf spring 61 is placed in cavity 325 in housing 40 with its ends resting on benches 327 and 328. The whole lever and shaft assembly 20 is then placed in housing 40 with detent 55 in detent retainer 161 slipping into cavity 354, foot 176 resting on seat 360, the lower or back surface of main bearing cover 160 resting on support 306, the bearing surface of shaft portions 106 and 110 resting on bearing surface 300 with rib 304 slipping into portions 109 of shaft 43, thereby locating the shaft, actuator 140 fitting in slot 312 and resting on right bearing 282, engaging portion 240 of carriage 66 fitting between teeth 145 and 146 of turn signal actuator 48, and the engaging portion of arm 235 of carriage 67 fitting in notch 132 between teeth 130 and 131 of beam change actuator 45. Leaf spring 60 is placed in bearing cover and leaf spring retainer 63, its lower or back surface resting on brackets 193 and 194 and its ends between flange 190 and nub 192. This assembly is placed on support 314, nub 192 dropping into notch 320 to locate it and the bottom or back of leaf spring 60 resting on flat 150 of cam 49. Screws 54A, 54B, 64A and 64B are then screwed through bores 163B, 163A, 186 and 187 respectively into bores 309, 310, 318 and 317 respectively to hold the lever and shaft assembly 417, carriages 66 and 67, and leaf springs 60 and 61 in place, leaf springs 60 and 61 each being bent about 0.010 inches in the process of tightening the screws. Contact means 72 and 73 are then placed on the tables 200 of carriages 66 and 67 respectively with bores 263 and 264 of each contact means fitting over pins 211 and 212 respectively of each carriage and the cut off corners of plate 260 acting as a key with locating plazas, such as 216, in tables 200 to indicate the proper orientation of the contact means. The circuit board 27 is preferably preassembled as part of a separate light guide and switch assembly 32. The windshield wiper and washer switch subassembly 35 is slid into the housing 40 and then the circuit board along with assembly 32 is placed in the housing and the screws 75A and 75B inserted as described above, compressing contacts such as 272 to their working height to complete the assembly of the turn signal and headlight beam change subassembly 36.

The turn signal and headlight beam change subassembly 36 operates as follows. In the neutral or unactivated position the lever 19 extends perpendicular to the housing front cover 18. Leaf springs 60 and 61 are bent and thus apply a bias force firmly gripping the flat sections 150 and 151 of first cam 49. Spring 46 is compressed and thus urges cam follower surface 127 of actuator 45 against cam surface 98 of lever 19. Blades 271 of contact means 72 and 73 are compressed by circuit board 27 and the blades in turn press carriages 66 and 67 against housing surfaces 290 and 308. Detent plunger 55 is pressed back against spring 57 by the cam surface 352 of detent arm 155. Detent plunger 69 is pushed against spring 70 by housing rib detent member 290. Thus all parts that are movable in the mechanism are under spring tension that will prevent any rattling and absorb any slack or looseness either in the system at manufacture due to tolerance variations or which develop later due to wear. In the neutral position of lever 19, the contacts 267 and 268 of contact means 72 contact circuit board 27 in the traceless area 412, while contacts 266 of contact means 72 contact trace 405, and contacts 267 and 268 of contact means 73 contact circuit board 27 in the traceless area 414 while contacts 266 of contact means 73 contact trace 409. If lever 19 is pressed down about 10° in a plane through the lever in FIGS. 3 and 4, then shaft 43 rotates 10° clockwise when viewed from the lever end and teeth 145 and 146 of turn signal actuator 48 pivot towards the carriage side of the bearing axis pivoting lever arms 236 counter-clockwise in FIG. 6 and causing carriage 66 to pivot 9° to the left in FIG. 5, which causes the center pair of contacts 267 in contact means 72 to contact trace 404, which completes a circuit between trace 405 and trace 404 activating a microprocessor (not shown) to turn on the left turn signal for as long as the lever is held in the position, which is typically used to signal a lane change. Likewise, if lever 19 is raised about 10° the teeth 145 and 146 pivot away from the carriage side of the bearing axis and carriage 66 pivots to the right in FIG. 5 causing contacts 267 of contact means 72 to contact trace 403 closing the circuit between trace 405 and trace 403 and momentarily turning on the right turn signal through the microprocessor. In the 10° range of motion the arc 152 portion of detent cam surface 352 contacts roller pin 56 of the detent mechanism. If, however, the lever 19 is pushed down 15° the detent cam and stop member 52 pivots counter clockwise in FIG. 9 so that the end of fingers 159 moves into contact with the roller pin 56. As the roller pin rolls up the ramp of the cam surface 352 to the end of finger 159, it and the detent plunger 55 are pushed to the left in FIG. 9 and FIG. 6 compressing spring 57. This increases the force on the lever arm in a manner that mimics the increase in force of a direct acting turn signal switch. Thus lever 19 feels like a prior art direct acting turn signal switch. The movement of lever 19 about 15° downward also, similarly to the previous description, moves carriage 66 to the left about 13° in FIG. 5 as shown in FIG. 7 which causes contact pair 268 to contact trace 402 which similarly activates a circuit to turn on the left turn signal, which will stay on until the steering wheel is turned and released, or for a predetermined time. If the lever 19 is lifted upward 15°, then finger 158 activates the detent mechanism and the contacts 268 contact trace which activates the right turn signal until the steering wheel is turned and released or for a predetermined time. When lever 19 is pushed 15° upward or downward it causes stop member 156 to contact turn signal stop engagement means 283. As described above, the housing 40 is reinforced in the area by bearing support 306 and wedge 346 to absorb large forces. Thus stop 156, integrally formed with the cam 52, prevents damage to all components inward of the cam 52, including actuator 48, carriage 66, contact means 72 and the traces it contacts on the circuit board. When the lever 19 is pushed upward or downward, first cam 49 also rotates with shaft 43. Any rotation will cause the wider part 152 of cam 49 to rotate between springs 60 and 61. The farther the lever is pushed the more the springs are bent, increasing the return bias force. Thus as soon as the lever is released the springs 60 and 61 will return as far as they can and cause the lever 19 to return to the neutral position. Such a movement that returns as soon as a release is made is called "momentary". If the distal end of lever 19 is pushed in toward housing 40 (FIG. 3A) about 10°, then cam surface 98 of lever 19 pushes cam follower surface 127 (FIG. 14A) of beam change actuator about 0.09 inches to the right in FIG. 5. This moves teeth 130 and 131 the same distance to the right which pivots arm 235 of carriage 67 clockwise in FIG. 6 which pivots the carriage 67 counterclockwise in FIG. 5, which causes contacts 267 of contact means 73 to contact trace 408 which closes the circuit between trace 409 and trace 408 and triggers a microprocessor to activate the high beams for as long as the lever 19 is held in the position. If the lever 19 is moved toward the housing 40 about 15° then actuator 45 moves about 0.14 inches to the right in FIG. 5 and carriage 67 pivots about 25° counterclockwise in the same FIG. This causes contacts 268 to contact trace 407 which activates the beam change function through the microprocessor; movement of carriage 67 25° also causes the end of projection 255 of detent plunger 69 to move across detent ramp 339 from indentation 338 into indentation 337. This provides both the feel of a direct action beam change switch closing and also a clicking sound mimicking the sound of a direct switch closing and indicating the beam change function has been activated. If lever 19 is pushed further toward housing 40, then beam change stop member 84D engages beam change stop engagement means 286 which stops the inward movement of lever 19 thereby preventing damage to all of the mechanism inward of the stop, including actuator 45, carriage 67 and contact means 73 and the traces it contacts on the circuit board. Whenever lever 19 is pushed in toward housing 40 it further compresses spring 46, increasing its return bias force; thus the lever will be returned to the neutral position as soon as it is released. Thus movement in any direction of switch lever 19 will be momentary.

Relating the detailed discussion of a specific embodiment above to the broader language of the claims, the electrical circuit means 418 (FIG. 15) comprises the contacts 386 and traces 401 through 410 on the circuit board 27. The manually operable means 450 for activating the circuit means 418 comprises lever 19, shaft 43, actuators 45 and 48, carriages 66 and 67, low pressure contact means 72 and 73 and the various portions of housing 40 which support and constrain these parts. The return means 420 includes the second cam 49, leaf springs 60 and 61, spring 46 spacer 47, leaf spring retainer 63, 45 insofar as it acts on cam surface 98, and the various portions of housing 40 which support and constrain these parts, such as the support 314. The means for constraining 422 comprises retainer 63 and support 314, particularly including the benches 327, flanges 183 and 188 and the walls of cavity 325. The means for stopping 455 includes cylinder 154 and stop member 156, the walls of slot 283, surface 44 of shaft 43, and stop engagement means 286.

It is a feature of the invention that the turn signal and headlight beam change assembly 36 is very compact. All of the many features of the invention described above and below (except for the long lever 19) are packed into about 2.5 cubic inches of space. Yet the system provides many advanced features not found in much larger systems. With the many devices and features now competing for space in a typical automobile, such compactness is important.

Another feature of the invention is its simplicity and reliability. The return for both the turn signal and the headlight beam change functions comprises only a few parts. The parts of the return mechanism are simple and strong and none of them are likely to fail even over long periods of time and extensive use. The assembly is also simple and economical to manufacture. Likewise the parts of the switching mechanism are also small and simple. Some prior art turn signal switches use microswitches to perform switching functions. One of the carriages, such as 66, together with its contact means 72, is smaller than a microswitch, yet performs two switching functions. However, despite their small size the switches are highly reliable and are not likely to break because the switching forces are isolated in the relatively strong lever and shaft parts while the contact forces are isolated in the contact means.

Another feature of the invention is the relatively high hardness level of the turn signal detent plunger roller bearing 56. The design of the turn signal detent mechanism is such that the high quality and hardness of this very tiny part permits the replacement of long internal switch lever arms of prior art turn signal switches with an assembly that occupies only about a quarter of a cubic inch.

A further feature of the invention is the separation of the turn signal detent and turn signal switching mechanisms. The turn signal detent means 425 utilizes a totally separate mechanism than the turn signal switching mechanism 426. This isolation of the two functions permits the separate adjustment of the switching and detent functions.

The fact that the turn signal detent member 155 and turn signal stop 156 are integrally formed in the same part is also a feature of the invention. This eliminates the tolerance buildup between the individual parts that would otherwise occur. Since these parts are both very rigid and unforgiving of tolerance variations, putting them on the same part eliminates the need for the close tolerance control that would otherwise be required over the length of the shaft 43 if these functions were separate as in prior art devices.

A related feature of the invention is the fact that the stop member 156 and the main bearing surface 429 (the adjacent ends of portions 106 and 110 of shaft 43) are adjacent to one another and adjacent to the lever arm 19. This places the principal stresses in the mechanism in one area. This area can be made relatively strong and to relatively tight tolerances, while the strength and tolerances of parts further along the system can be relaxed, with resulting economics of manufacture. Note that the two screws 54A and 54B are close to this critical area, symmetrically placed with respect to the area, thus minimizing non-functional movement in this area.

An important feature of the invention is the shape of the engaging portions 240 and 242 of carriages 66 and 67. The equally rounded curvatures in the vertical and horizontal planes results in the lever arm between the axis 11 of shaft 43 and the center of pivot, such as the center of bore 231, remaining constant throughout the movement of the switch mechanism. This keeps the switching forces constant which prevents uneven stress points from forming and also provides a pleasant manual feel to the switching mechanism. Note that this feature results in the forces being exerted primarily at the engaging rim, such as 244, which is the strongest area of the engaging means and close to the base of the pivot pin, such as 291. The shape of the engaging portions 240 and 242 also prevents both jamming and undesirable clearances in the interactions of the arms 235 and 236 and the teeth, such as 145 and 146. As the arms 236 and 235 pivot, their alignment with the notches 147 between teeth 145 and 146, and 132 between teeth 130 and 131, respectively change. In the neutral position the arm, such as 235, is perpendicular to the plane of the notch, such as 132, and the line of the arm extends straight through the notch. As the arm 235 pivots, it angles across the notch 132. If the arm 235 were square, it would have to be either too small to touch the sides of the notch when it passes straight through or so wide as to cause pinching or jamming when it passes through at an angle. With the roundness in the pivotal plane, the engaging portion 242 of the arm 235 always exactly fits across notch 132, with no jamming or slop. It should also be noted that the beam change transmission means 427 is a "rack and pinion" type transmission means while the turn signal transmission means 428 is a "bevel gear" type transmission means in that transmission means 427 converts the linear motion of actuator 45 into the rotational motion of the carriage 67, while transmission means 428 converts rotational motion about axis 11 into rotational motion about a perpendicular axis, namely, the axis of pin 292.

A related feature of the invention to the above feature is the elimination of looseness in the switch actuation mechanism. Since turn signal levers are relatively long, any looseness or play anywhere in the assembly is magnified many times in the long lever arm. The zero clearance in the transmission means throughout the travel of the mechanism which was just discussed and the zero clearance of the shaft 43 and wall 103 of slot 86 discussed earlier contribute to this feature. The fact that all moving parts are under spring tension, which was also discussed earlier, also contributes. This feature makes for a rattle-free module, which is extremely important in an automobile today.

The windows 293 and 294 are another feature of the invention. These windows allow the critical transmission means 427 and 428 to be viewed from outside the housing 40. This is surprisingly useful as they permitted a host of problems that arose during development to be quickly identified. For example, viewing the transmission means while pressing on lever 19 usually indicates whether any binding or jamming is in the assembly before or after the transmission means. They are also useful for sales and engineering demonstrations and repair analysis. Further, the windows provide additional clearance for the transmission means 427 and 428. Since the means are at the end of the actuator lever arms, which are the longest dimension of the assembly in the backward direction, they allow the entire back wall to be moved in slightly with a relatively large savings in total volume of the module. Thus both space for reducing potential binding problems between the transmission means 427 and 428 and housing 40 and viewability for diagnosis and possible repair of other binding problems is provided.

Still another feature of the invention is that the contacts, such as 272, exert very low pressure on the traces of circuit board 27. The pressure exerted by a singe contact is typically about 2 ounces. This pressure is significantly lower (less than ¼ as much) than the pressure normally associated with switching actions by the fingers or other limbs of humans. This is possible because the contacts act in a direction perpendicular to and thus independent of the direction of manual operation of carriages 66 and 67.

A further feature of the invention is that the contact means are part of a low power circuit. The electrical circuits 418 preferably carry 5 volts and 25 milliamps of power, though for some functions they may carry 10 milliamps. Generally "low" power may be considered anything less than 1 amp since "normal" power automotive circuits generally carry power of the order of 5 or 10 amps.

A novel manually operated electromechanical switch that provides a return function, does not become loose with wear, is compact and has many other features and advantages has been described. It is evident that those skilled in the art may now make many modifications and uses of the specific embodiment described without departing from the inventive concepts. For example, many other sizes, shapes and materials may be used for the parts. Other features may be added, or it may be used by itself or incorporated in other module designs. Consequently the invention is to be construed as embracing each and every novel feature and novel combination of features present in the switch described.

What is claimed is:

1. An electromechanical switch comprising:
   electrical circuit means;
   manually operable means for activating said circuit means, said manually operable means moveable between a neutral position and an activate position; and
   return means for returning said manually operable means to said neutral position from said activate position, said return means comprising:
   a first cam connected to said manually operable means:
   at least one leaf spring; and
   housing means for supporting said first cam and said leaf spring with said leaf spring engaged with said first cam and bent by said first cam a first non-zero amount when said manually operable means is in said neutral position and a second amount larger than said first amount when said manually operable means is in said activate position, said first cam shaped so that as said manually operable means moves from said activate position to said neutral position the bending of said leaf spring continuously becomes less, whereby said leaf spring forces said first cam toward the position in which said leaf spring is bent said first amount, thereby returning said manually operable means to said neutral position; and said switch further comprising detent means for causing a change of feel in said manually operable means as it approaches said activate position without holding it in said activate position.

2. A switch as in claim 1 wherein said leaf spring comprises an elongated member and said housing means comprises means for containing both ends of said elongated member in two directions and allowing said ends to move in a third direction.

3. A switch as in claim 2 wherein there are two of said elongated leaf spring members, said housing means comprises means for supporting both of said leaf spring members, and said first cam is sandwiched between said leaf spring members.

4. A switch as in claim 3 wherein said cam comprises a cylindrical member having two oppositely disposed flat sides parallel to the axis of said cylindrical member, said elongate members are substantially straight when not under stress, and said means for constraining comprises a means for holding said two elongated leaf spring members substantially parallel with the ends of one of said elongated member a distance from the ends of the other of said elongated members that is shorter than the distance between the two flat sides of said first cam.

5. A switch as in claim 1 wherein said detent means includes a second cam separate from said first cam and wherein said switch further comprises stop means for stopping the movement of said manually operable means after it has been moved to said activate position, said stop means including a stop member integrally formed with said second cam; and means for engaging said stop member to stop the motion of said manually operable means.

6. A switch as in claim 5 wherein said manually operable means includes a lever means external of said housing for being manually contacted a journal connected to said lever means, and a main bearing in which said journal connected to said lever means, and a main bearing in which said journal turns, and said stop means is located between said lever means and said main bearing.

7. A switch as in claim 6 wherein said electrical circuit means includes a trace and said manually operable means further includes low pressure contact means for contacting said trace with a contact force significantly lower than the force normally associated with limb motions of adult humans, and said main bearing and stop means are located between said lever means and said low pressure contact means.

* * * * *